United States Patent
Ishii et al.

(10) Patent No.: US 12,359,056 B2
(45) Date of Patent: Jul. 15, 2025

(54) BLOCK-COPOLYMER PELLETS, TACKY ADHESIVE COMPOSITION, AND STRETCH FILM

(71) Applicant: ZEON CORPORATION, Tokyo (JP)

(72) Inventors: Yuta Ishii, Tokyo (JP); Atsushi Nozawa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 593 days.

(21) Appl. No.: 17/904,593

(22) PCT Filed: Feb. 17, 2021

(86) PCT No.: PCT/JP2021/005984
§ 371 (c)(1),
(2) Date: Aug. 19, 2022

(87) PCT Pub. No.: WO2021/172140
PCT Pub. Date: Sep. 2, 2021

(65) Prior Publication Data
US 2023/0111050 A1    Apr. 13, 2023

(30) Foreign Application Priority Data
Feb. 25, 2020   (JP) ................... 2020-029886

(51) Int. Cl.
*C08L 53/02*    (2006.01)
*C08J 3/12*     (2006.01)
*C08L 23/06*    (2006.01)
*C09J 7/30*     (2018.01)

(52) U.S. Cl.
CPC ............... *C08L 53/02* (2013.01); *C08J 3/12* (2013.01); *C08L 23/06* (2013.01); *C09J 7/30* (2018.01); *C08L 2203/16* (2013.01); *C09J 2453/00* (2013.01)

(58) Field of Classification Search
CPC .. C08J 3/12; C08L 53/02; C08L 23/06; C08L 23/12
See application file for complete search history.

(56) References Cited

U.S. PATENT DOCUMENTS 4,359,492 A * 11/1982 Schlademan ............ C08J 3/124
427/195
2016/0326412 A1 * 11/2016 Hoshina .................. C08L 23/04

FOREIGN PATENT DOCUMENTS

JP    2016069565 A    5/2016

OTHER PUBLICATIONS

Feb. 5, 2024, the Extended European Search Report issued by the European Patent Office in the corresponding European Patent Application No. 21761263.9.
Apr. 13, 2021, International Search Report issued in the International Patent Application No. PCT/JP2021/005984.

* cited by examiner

*Primary Examiner* — Mark S Kaucher
(74) *Attorney, Agent, or Firm* — KENJA IP LAW PC

(57) ABSTRACT

A block-copolymer pellet having 100 parts by weight of a pellet-shaped article of a block copolymer (A) and 0.01 to 5 parts by weight of a hydrocarbon-based dusting agent (B) is provided, wherein the block copolymer (A) has at least one aromatic vinyl polymer block and at least one conjugated diene polymer block, the hydrocarbon-based dusting agent (B) has a BET specific surface area of 0.50 to 3.00 m$^2$/g, a volume average particle size of 2.0 to 20 μm, a bulk density of 0.10 to 0.34 g/cm$^3$, and a melting point of 75° C. or higher, and the block-copolymer pellet has a Shore A hardness of 10 to 80, and a BET specific surface area of 0.001 to 0.05 m$^2$/g measured by a Kr adsorption method.

8 Claims, No Drawings

BLOCK-COPOLYMER PELLETS, TACKY ADHESIVE COMPOSITION, AND STRETCH FILM

TECHNICAL FIELD

The present invention pertains to a block-copolymer pellet which exhibits suppressed dusting, and has excellent block resistance, excellent transparency, and high adhesiveness to an adherend, and also pertains to an adhesive composition and a stretch film obtained using such a block-copolymer pellet.

BACKGROUND ART

A block copolymer having an aromatic vinyl polymer block and a conjugated diene polymer block, such as a styrene-isoprene-styrene block copolymer (SIS) and a styrene-butadiene-styrene block copolymer (SBS), is a thermoplastic elastomer having characteristic properties in different aspects. For this reason, such a block copolymer is used in various applications (see Patent Document 1, for example).

Meanwhile, such a block copolymer having an aromatic vinyl polymer block and a conjugated diene polymer block itself has adhesiveness, and thus easily generates blocking problems. For this reason, in the case where such a block copolymer is pelletized and processed, the handling has been difficult and problematic.

In order to prevent blocking of pellets formed from such a block copolymer having an aromatic vinyl polymer block and a conjugated diene polymer block, the commonly used method is that an anti-blocking agent prepared from fine powders of talc, a fatty acid amide, or the like is attached to a surface of the pellets so that the pellets do not directly contact each other. However, using such an anti-blocking agent may result in problems such as turbidity and loss of transparency.

RELATED ART

Patent Documents

Patent Document 1: Japanese Unexamined Patent Application Publication No. 2016-69565

SUMMARY OF THE INVENTION

Problem to be Solved by the Invention

The present invention is completed in view of solving the problem above. It is an object of the present invention to provide a block-copolymer pellet which exhibits suppressed dusting, and has excellent block resistance, excellent transparency, and high adhesiveness to an adherend. The present invention also pertains to an adhesive composition and a stretch film obtained using such a block-copolymer pellet.

Means for Solving Problems

As a result of research to achieve the aforementioned object, the inventors have found that the object can be achieved by a block-copolymer pellet comprising a dusting agent and a pellet-shaped article of a block copolymer containing a block copolymer having an aromatic vinyl polymer block and a conjugated diene polymer block, the dusting agent being present in a specific amount and being a hydrocarbon-based dusting agent having a specific surface area, a volume average particle size, a bulk density, and a melting point controlled within specific ranges, the block-copolymer pellet having a Shore A hardness and a BET specific surface area within the specific ranges. This finding has led to the completion of the present invention.

In other words, according to the present invention, a block-copolymer pellet comprising 100 parts by weight of a pellet-shaped article of a block copolymer (A) and 0.01 to 5 parts by weight of a hydrocarbon-based dusting agent (B) is provided, wherein the block copolymer (A) has at least one aromatic vinyl polymer block and at least one conjugated diene polymer block, the hydrocarbon-based dusting agent (B) has a BET specific surface area of 0.50 to 3.00 $m^2/g$, a volume average particle size of 2.0 to 20 μm, a bulk density of 0.10 to 0.34 $g/cm^3$, and a melting point of 75° C. or higher, and the block-copolymer pellet has a Shore A hardness of 10 to 80 and a BET specific surface area of 0.001 to 0.05 $m^2/g$ measured by a Kr adsorption method.

In the present invention, the hydrocarbon-based dusting agent (B) preferably contains 3 to 40 vol % of particles having a particle size of 20 μm or more.

In the present invention, the pellet-shaped article preferably further contains 0.5 to 5.0 parts by weight of a polystyrene polymer with respect to 100 parts by weight of the block copolymer (A).

In the present invention, the hydrocarbon-based dusting agent (B) is preferably a dusting agent prepared from a polyolefin-based polymer.

In the present invention, the content of aromatic vinyl monomer units in the block copolymer (A) is preferably 10 to 50 wt %.

In the present invention, the aromatic vinyl polymer block is preferably a polymer block having styrene units as main repeating units, and the conjugated diene polymer block is preferably a polymer block having isoprene units as main repeating units.

Further, the present invention provides an adhesive composition obtained using the block-copolymer pellet described above.

In addition, the present invention provides a stretch film obtained using the block-copolymer pellet described above.

Effects of Invention

The present invention can provide a block-copolymer pellet which exhibits suppressed dusting, and has excellent block resistance, excellent transparency, and high adhesiveness to an adherend. The present invention can also provide an adhesive composition and a stretch film obtained using such a block-copolymer pellet.

DESCRIPTION OF EMBODIMENTS

A block-copolymer pellet according to the present invention is a block-copolymer pellet comprising 100 parts by weight of a pellet-shaped article of a block copolymer (A) and 0.01 to 5 parts by weight of a hydrocarbon-based dusting agent (B), wherein the block copolymer (A) has at least one aromatic vinyl polymer block and at least one conjugated diene polymer block, the hydrocarbon-based dusting agent (B) has a BET specific surface area of 0.50 to 3.00 $m^2/g$, a volume average particle size of 2.0 to 20 μm, a bulk density of 0.10 to 0.34 g/cm³, and a melting point of 75° C. or higher, and the block-copolymer pellet according to the present invention has a Shore A hardness of 10 to 80 and a BET specific surface area of 0.001 to 0.05 m²/g measured by a Kr adsorption method.

<Block Copolymer (A)>

The block copolymer (A) used herein has at least one aromatic vinyl polymer block and at least one conjugated diene polymer block.

The aromatic vinyl polymer block is a polymer block constituted of repeating units which are mainly aromatic vinyl monomer units obtained by polymerizing an aromatic vinyl monomer.

The content of aromatic vinyl monomer units in the aromatic vinyl polymer block is preferably 80 wt % or more, more preferably 90 wt % or more, particularly preferably substantially 100 wt %.

The aromatic vinyl monomer used to form the aromatic vinyl polymer block can be any aromatic vinyl compound without limitation. Examples thereof include styrene; styrene compounds having an alkyl group as a substituent, such as α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, and 5-t-butyl-2-methylstyrene; styrene compounds having a halogen atom as a substituent such as 2-chlorostyrene, 3-chlorostyrene, 4-chlorostyrene, 4-bromostyrene, and 2,4-dibromostyrene; styrene compounds having an alkyl group and a halogen atom as substituents such as 2-methyl-4,6-dichlorostyrene; vinyl naphthalene; and the like. One of these aromatic vinyl monomers may be used alone, or two or more of them may be used in combination. Among these, from the viewpoint of availability, styrene and styrene compounds having an alkyl group as a substituent are preferable, and the use of styrene is particularly preferable.

The aromatic vinyl polymer block may contain different monomer units as long as the aromatic vinyl monomer units are the main repeating units. Examples of monomers constituting such monomer units different from the aromatic vinyl monomer units which may be contained in the aromatic vinyl polymer block include conjugated diene monomers such as 1,3-butadiene and isoprene (2-methyl-1,3-butadiene); α,β-unsaturated nitrile monomers such as acrylonitrile and methacrylonitrile; unsaturated carboxylic acid monomers such as acrylic acid, methacrylic acid, maleic acid, fumaric acid, and itaconic acid; unsaturated carboxylic anhydrides such as maleic anhydride, butenyl succinic anhydride, tetrahydrophthalic anhydride, and citraconic anhydride; unsaturated carboxylic acid ester monomers such as methyl acrylate, ethyl acrylate, 2-ethylhexyl acrylate, methyl methacrylate, ethyl methacrylate, and 2-ethylhexyl methacrylate; nonconjugated diene monomers preferably having 5 to 12 carbons, such as 1,4-pentadiene and 1,4-hexadiene; and the like.

In the case where the block copolymer (A) has a plurality of aromatic vinyl polymer blocks, the plurality of aromatic vinyl polymer blocks may be identical or different from each other.

The content of aromatic vinyl monomer units is preferably 10 to 50 wt %, more preferably 11 to 40 wt %, still more preferably 12 to 38 wt % of the total monomer units constituting the block copolymer (A) without limitation. In the case where the content of aromatic vinyl monomer units in the block copolymer (A) is within such a range, the block copolymer (A) can provide an excellent adhesive property and moldability. The content of aromatic vinyl monomer units in the block copolymer (A) can be measured using $^1$H-NMR. Alternatively, in the case where all the polymer components constituting the block copolymer (A) are constituted of only aromatic vinyl monomer units and conjugated diene monomer units, the conjugated diene monomer unit portions are decomposed by performing ozonolysis of the polymer components in the block copolymer (A), and then reducing the decomposed components by lithium aluminum hydride in accordance with the method described in Rubber Chem. Technol., 45, 1295 (1972), and therefore the aromatic vinyl monomer unit portions only can be extracted. This leads to an easy measurement of the total content of aromatic vinyl monomer units.

The conjugated diene polymer block is a polymer block constituted of repeating units which are mainly conjugated diene monomer units obtained by polymerizing a conjugated diene monomer.

The content of conjugated diene monomer units in the conjugated diene polymer block is preferably 80 wt % or more, more preferably 90 wt % or more, particularly preferably substantially 100 wt %.

The conjugated diene monomer used to form the conjugated diene polymer block can be any conjugated diene compound without limitation. Examples thereof can include 1,3-butadiene, isoprene, 2,3-dimethyl-1,3-butadiene, 2-chloro-1,3-butadiene, 1,3-pentadiene, 1,3-hexadiene, and the like. One of these conjugated diene monomers may be used alone, or two or more of them may be used in combination. Among these, 1,3-butadiene and/or isoprene are preferably used, and isoprene is particularly preferably used. The presence of isoprene units as a constituent of the conjugated diene polymer block can provide an excellent adhesive property and flexibility.

The conjugated diene polymer block may contain different monomer units as long as the conjugated diene monomer units are the main repeating units. Examples of monomers constituting such monomer units different from the conjugated diene monomer units which may be contained in the conjugated diene polymer block include aromatic vinyl monomers such as styrene and α-methylstyrene, α, β-unsaturated nitrile monomers, unsaturated carboxylic acid monomers, unsaturated carboxylic anhydrides, unsaturated carboxylic acid ester monomers, nonconjugated diene monomers, and the like. Examples of α,β-unsaturated nitrile monomers, unsaturated carboxylic acid monomers, unsaturated carboxylic anhydrides, unsaturated carboxylic acid ester monomers, and nonconjugated diene monomers can be the same as the ones in the examples of monomers constituting monomer units different from the aromatic vinyl monomer units which may be contained in the aromatic vinyl polymer block described above.

In the case where the block copolymer (A) has a plurality of conjugated diene polymer blocks, the plurality of conjugated diene polymer blocks may be identical or different from each other. Furthermore, some of unsaturated bonds in the conjugated diene polymer blocks may be hydrogenated.

The content of vinyl bonds in the conjugated diene polymer block (the proportion of 1,2-vinyl bond and 3,4-vinyl bond in all the conjugated diene monomer units in the conjugated diene polymer block) is preferably 1 to 20 mol %, more preferably 2 to 15 mol %, particularly preferably 3 to 10 mol % without limitation. The content of vinyl bonds in the conjugated diene polymer block can be measured using $^1$H-NMR.

The block copolymer (A) may be any block copolymer that has at least one aromatic vinyl polymer block and at least one conjugated diene polymer block. The block copolymer (A) may also contain a plurality of copolymer components in which the number of polymer blocks and their bonded structure are different.

Specific examples of structures of the block copolymer (A) include, but not limited to, aromatic vinyl-conjugated diene diblock copolymer components represented as Ar-D, aromatic vinyl-conjugated diene-aromatic vinyl block copolymer components represented as Ar-D-Ar or $(Ar-D)_n$-X, conjugated diene-aromatic vinyl-conjugated diene block copolymer components represented as D-Ar-D or $(D-Ar)_n$-X, aromatic vinyl-conjugated diene-aromatic vinyl-conjugated diene block copolymer components represented as Ar-D-Ar-D, and a mixture of block copolymer components which is a mixture of any combination of two or more of these, where Ar represents an aromatic vinyl polymer block, D represents a conjugated diene polymer block, X represents a single bond or a coupling agent residue, and n represents an integer of 2 or greater.

Among these, a mixture of an aromatic vinyl-conjugated diene diblock copolymer component represented as Ar-D and an aromatic vinyl-conjugated diene-aromatic vinyl block copolymer component represented as Ar-D-Ar or $(Ar-D)_n$-X is suitable for the block copolymer (A).

Aromatic vinyl-conjugated diene diblock copolymer components represented as Ar-D have one aromatic vinyl polymer block and one conjugated diene polymer block. The content of such a diblock copolymer component in the block copolymer (A) is preferably 0 to 90 wt %, more preferably 0 to 80 wt %, still more preferably 10 to 70 wt % without particular limitation.

Aromatic vinyl-conjugated diene-aromatic vinyl block copolymer components represented as Ar-D-Ar have two aromatic vinyl polymer blocks. In this block copolymer component, the weight average molecular weight of the two aromatic vinyl polymer blocks may be identical or different. Specifically, the block copolymer components represented as Ar-D-Ar may be symmetric aromatic vinyl-conjugated diene-aromatic vinyl block copolymer components constituted of an aromatic vinyl polymer block having a predetermined weight average molecular weight, a conjugated diene polymer block, and an aromatic vinyl polymer block having the predetermined weight average molecular weight linked in this order, or may be asymmetric aromatic vinyl-conjugated diene-aromatic vinyl block copolymer components constituted of an aromatic vinyl polymer block having a relatively small weight average molecular weight, a conjugated diene polymer block, and an aromatic vinyl polymer block having a relatively large weight average molecular weight linked in this order.

Aromatic vinyl-conjugated diene-aromatic vinyl block copolymer components represented as $(Ar-D)_n$-X are block copolymer components in which two or more diblock bodies famed from an aromatic vinyl polymer block and a conjugated diene polymer block linked together bind to each other directly by a single bond or via a coupling agent residue. The coupling agent forming the coupling agent residue is described below. The number (that is n) of diblock bodies (Ar-D) linked may be any number that is 2 or greater without limitation, and block copolymer components having a different number of diblock bodies bound may be present in a mixed manner. n may be any number that is an integer of 2 or greater without limitation. n is generally an integer of 2 to 8, preferably an integer of 2 to 4.

The weight average molecular weight of the block copolymer (A) is preferably 30,000 to 500,000, more preferably 35,000 to 400,000, still more preferably 40,000 to 250,000 without limitation.

The weight average molecular weights of the individual polymer blocks in the block copolymer (A) are also not particularly limited. The weight average molecular weight of the aromatic vinyl polymer block is preferably 6,000 to 400,000, more preferably 6,000 to 370,000. Too small a weight average molecular weight of the aromatic vinyl polymer block may result in a poor adhesive property, and too large a weight average molecular weight of the aromatic vinyl polymer block may lead to high viscosity and difficulties in the production of the block copolymer (A).

The weight average molecular weight of the conjugated diene polymer block is preferably 18,000 to 400,000, more preferably 19,000 to 350,000. Too small a weight average molecular weight of the conjugated diene polymer block may result in a poor adhesive property, and too large a weight average molecular weight of the conjugated diene polymer block may lead to high viscosity.

The molecular weight distribution represented by the ratio (Mw/Mn) of the weight average molecular weight (Mw) and the number average molecular weight (Mn) of each polymer block constituting the block copolymer (A) is preferably 1.1 or less, more preferably 1.05 or less although not particularly limited thereto.

The weight average molecular weights and the number average molecular weights of the block copolymer (A), each copolymer component, and each polymer block are measured by high-performance liquid chromatography, and determined based on polystyrene-equivalent values. The weight average molecular weight and the number average molecular weight are measured by high-performance liquid chromatography using tetrahydrofuran at a flow rate of 0.35 ml/min as a carrier, and determined as polystyrene-equivalent molecular weights. The apparatus used is HLC 8320 available from TOSOH CORPORATION, the columns used are three connected Shodex KF-404HQ columns available from SHOWA DENKO K.K. (column temperature: 40° C.), and the detectors used are a differential refractometer and an ultraviolet detector. Molecular weight can be calibrated at 12 points using polystyrene standards (from 500 to 3,000,000) available from POLYMER LABORATORIES LTD.

The block copolymer (A) used herein may contain a component other than the block copolymer components as required. Examples of components other than the block copolymer components include antioxidants, softeners, tackifiers, antimicrobial agents, photostabilizers, ultraviolet absorbing agents, dyes, lubricants, cross-linking agents, cross-linking accelerators, and the like.

The block copolymer (A) used herein can be produced by any method without limitation, and can be produced in accordance with a conventional method for producing a block copolymer. For example, in the case where the block copolymer (A) contains an aromatic vinyl-conjugated diene diblock copolymer component (A1) represented as Ar-D and an aromatic vinyl-conjugated diene-aromatic vinyl triblock copolymer component (A2) represented as $(Ar-D)_2$-X, the block copolymer (A) can be produced by the following method.

Specifically, the block copolymer (A) can be produced by a producing method having steps (1) to (4) below:
(1): preparing a solution containing a terminally active aromatic vinyl polymer by polymerizing an aromatic vinyl monomer in a solvent in the presence of a polymerization initiator,
(2): preparing a solution containing a terminally active aromatic vinyl-conjugated diene block copolymer by adding a conjugated diene monomer to the solution containing a terminally active aromatic vinyl polymer prepared in step (1) described above, and polymerizing the conjugated diene monomer, (3): preparing a solution containing the diblock copolymer component (A1) and a triblock copolymer component (A2) by adding a bifunctional coupling agent to the solution containing a terminally active aromatic vinyl-conjugated diene block copolymer prepared in step (2) described above such that the total amount of the functional groups is less than 1 molar equivalent relative to the active terminal, and coupling part of the terminally active aromatic vinyl-conjugated diene block copolymer, and (4): collecting the block copolymer (A) containing the diblock copolymer component (A1) and the triblock copolymer component (A2) from the solution containing the diblock copolymer component (A1) and the triblock copolymer component (A2) prepared in step (3) described above.

<Step (1)>

In the above-described producing method, first, in step (1), a solution containing a terminally active aromatic vinyl polymer is prepared by polymerizing an aromatic vinyl monomer in a solvent in the presence of a polymerization initiator.

As the polymerization initiator, a polymerization initiator known to have anionic polymerization activity to aromatic vinyl monomers and conjugated diene monomers can be used. Examples of polymerization initiators include organic alkali metal compounds, organic alkaline earth metal compounds, organic lanthanoid rare earth metal compounds, and the like.

Among organic alkali metal compounds, organic lithium compounds having one or more lithium atoms in the molecule are particularly suitably used. Specific examples of organic alkali metal compounds include organic monolithium compounds such as ethyllithium, n-propyllithium, isopropyllithium, n-butyllithium, sec-butyllithium, t-butyllithium, hexyllithium, phenyllithium, stilbenelithium, dialkylaminolithium, diphenylaminolithium, and ditrimethylsilylaminolithium; organic dilithium compounds such as methylenedilithium, tetramethylenedilithium, hexamethylenedilithium, isoprenyldilithium, and 1,4-dilithio-ethylcyclohexane; and further, organic trilithium compounds such as 1,3,5-trilithiobenzene; and the like. Among these, organic monolithium compounds are particularly suitably used.

Examples of organic alkaline earth metal compounds include n-butylmagnesium bromide, n-hexylmagnesium bromide, ethoxycalcium, calcium stearate, t-butoxystrontium, ethoxybarium, isopropoxybarium, ethylmercaptobarium, t-butoxybarium, phenoxybarium, diethylaminobarium, barium stearate, ethylbarium, and the like.

Besides, those which form a homogeneous system in an organic solvent and have an ability to induce living polymerization therein can also be used, for example, composite catalysts composed of lanthanoid rare earth metal compounds (including neodymium, samarium, gadolinium, and the like)/alkylaluminum/alkylaluminum halide/alkylaluminum hydride, or metallocene catalysts containing titanium, vanadium, samarium, gadolinium, or the like.

These polymerization initiators described above may be used alone in combination as a mixture. The amount of the polymerization initiator to be used can be determined according to the desired molecular weight of each block copolymer, and is not particularly limited. The amount is preferably 0.01 to 20 mmol, more preferably 0.05 to 15 mmol, still more preferably 0.1 to 10 mmol per 100 g of all the monomers to be used in polymerization.

The solvent used in polymerization may be any solvent that is inactive to the polymerization initiator, and is not particularly limited. Examples thereof include linear hydrocarbon solvents, cyclic hydrocarbon solvents, mixed solvents thereof, and the like. Examples of the linear hydrocarbon solvents include $C_{4-6}$ linear alkanes and alkenes such as n-butane, isobutane, 1-butene, isobutylene, trans-2-butene, cis-2-butene, 1-pentene, trans-2-pentene, cis-2-pentene, n-pentane, isopentane, neo-pentane, and n-hexane, and the like. Examples of the cyclic hydrocarbon solvents include aromatic compounds such as benzene, toluene, and xylene; alicyclic hydrocarbon compounds such as cyclopentane and cyclohexane; and the like. These solvents may be used alone or in combination as a mixture.

Although not particularly limited, the amount of the solvent to be used is set such that the total concentration of the block copolymer in the solution after polymerization reaction is preferably 5 to 60 wt %, more preferably 10 to 55 wt %, still more preferably 20 to 50 wt %.

Further, in polymerization, a Lewis base compound may be added to the reaction system to control the structure of each polymer block of each block copolymer. Examples of the Lewis base compounds include ethers such as tetrahydrofuran, diethyl ether, dioxane, ethylene glycol dimethyl ether, ethylene glycol dibutyl ether, diethylene glycol dimethyl ether, and diethylene glycol dibutyl ether; tertiary amines such as tetramethylethylenediamine, trimethylamine, triethylamine, pyridine, and quinuclidine; alkali metal alkoxides such as potassium-t-amyl oxide and potassium-t-butyl oxide; phosphines such as triphenylphosphine; and the like. These Lewis base compounds may be used alone or in combination as a mixture.

The Lewis base compound can be added at any timing, which may be appropriately determined according to the desired structure of each block copolymer. For example, the Lewis base compound may be preliminarily added before polymerization is started, or may be added after the polymer blocks are partially polymerized. In addition, the Lewis base compound may be preliminarily added before polymerization is started, and additionally added after the polymer blocks are partially polymerized.

The polymerization reaction temperature is preferably 10 to 150° C., more preferably 30 to 130° C., still more preferably 40 to 90° C. The polymerization time is preferably 48 hours or less, more preferably 0.5 to 10 hours. The polymerization pressure may be in any range of pressure sufficient for maintaining the monomer and the solvent in a liquid phase at the polymerization temperature, and is not particularly limited.

A solution containing a terminally active aromatic vinyl polymer can be prepared by polymerizing the aromatic vinyl monomer in the solvent in the presence of the polymerization initiator under such conditions.

<Step (2)>

Then, in step (2), a solution containing a terminally active aromatic vinyl-conjugated diene block copolymer is prepared by adding the conjugated diene monomer to the solution containing a terminally active aromatic vinyl polymer obtained in step (1) described above, and polymerizing the conjugated diene monomer.

In step (2), as a result of addition of the conjugated diene monomer to the solution containing a terminally active aromatic vinyl polymer obtained in step (1) described above, a conjugated diene polymer chain is formed beginning at the active terminal, thereby obtaining a solution containing a terminally active aromatic vinyl-conjugated diene block copolymer.

<Step (3)>

In step (3), a solution containing a diblock copolymer component (A1) and a triblock copolymer component (A2) is prepared by adding a coupling agent to the solution containing a terminally active aromatic vinyl-conjugated diene block copolymer prepared in step (2) described above such that the total amount of its functional groups is less than 1 molar equivalent relative to the active terminal, and coupling part of the terminally active aromatic vinyl-conjugated diene block copolymer.

The bifunctional coupling agent may be any bifunctional coupling agent that has two functional groups that react with the active terminal, and is not particularly limited. Examples thereof include bifunctional halogenated silanes such as dichlorosilane, monomethyldichlorosilane, and dimethyldichlorosilane; bifunctional halogenated alkanes such as dichloroethane, dibromoethane, methylene chloride, and dibromomethane; bifunctional halogenated tins such as dichlorotin, monomethyldichlorotin, dimethyldichlorotin, monoethyldichlorotin, diethyldichlorotin, monobutyldichlorotin, and dibutyldichlorotin; and the like. One of these coupling agents may be used alone, or two or more of them may be used in combination.

The amount of the bifunctional coupling agent to be used may be determined according to the ratio of the diblock copolymer component (A1) and the triblock copolymer component (A2).

<Step (4)>

Next, in step (4), a block copolymer (A) containing the diblock copolymer component (A1) and the triblock copolymer component (A2) is collected from the solution containing the diblock copolymer component (A1) and the block copolymer component (A2) prepared in step (3) described above.

The collecting method may be any conventional method without limitation. For example, the desired block copolymer (A) can be collected by adding a polymerization terminator as required after the completion of the reaction to deactivate the active terminal of the terminally active polymer, further adding an additive such as an antioxidant as required, and then applying a known solvent method such as direct drying and steam stripping to the solution.

Although the polymerization terminator may be any polymerization terminator that can react with the active terminal to deactivate the active terminal, and is not particularly limited, the polymerization terminator is preferably a compound containing no halogen atom. Among others, the polymerization terminator generating a metal alkoxide, a metal aryloxide, or a metal hydroxide through the reaction with the active terminal is particularly preferable. Specific examples of the polymerization terminators include water; monohydric alcohols such as methanol and ethanol; monohydric phenols such as phenol and cresol.

In the case where the block copolymer (A) is collected as a slurry by steam stripping or the like, preferably, the slurry is dehydrated using any dehydrator such as an extrusion-type squeezer, and the block copolymer (A) in the foim of crumb is collected, and the crumb obtained is further dried using any dryer such as a band dryer and an expansion extrusion dryer.

In the case where the block copolymer (A) contains an aromatic vinyl-conjugated diene-aromatic vinyl triblock copolymer component (A3) represented as Ar-D-Ar, the block copolymer (A) can be produced by the following method.

Specifically, the block copolymer (A) can be produced by a producing method having steps (1a) to (4a) below:

(1a): preparing a solution containing a terminally active aromatic vinyl polymer by polymerizing an aromatic vinyl monomer in a solvent in the presence of a polymerization initiator, (2a): preparing a solution containing a terminally active aromatic vinyl-conjugated diene block copolymer by adding the conjugated diene monomer to the solution containing a terminally active aromatic vinyl polymer prepared in step (1a) described above, and polymerizing the conjugated diene monomer, (3a): preparing a solution containing a triblock copolymer component (A3) by adding an aromatic vinyl monomer to the solution containing a terminally active aromatic vinyl-conjugated diene block copolymer prepared in step (2a) described above to polymerize the aromatic vinyl monomer, and (4a): collecting the block copolymer (A) containing the triblock copolymer component (A3) from the solution containing a triblock copolymer component (A3) prepared in step (3a) described above.

<Steps (1a) and (2a)>

Steps (1a) and (2a) are similar to steps (1) and (2) described above, and the same conditions can be employed.

<Step (3a)>

In step (3a), a solution containing a triblock copolymer component (A3) is prepared by adding the aromatic vinyl monomer to the solution containing a terminally active aromatic vinyl-conjugated diene block copolymer prepared in step (2a) described above to polymerize the aromatic vinyl monomer.

At this time, the polymerization conditions including the amount of the aromatic vinyl monomer in step (3a) can be determined according to a desired weight average molecular weight of an aromatic vinyl polymer block to be famed and the like (for example, the polymerization conditions can be determined in the range described in step (1) described above).

<Step (4a)>

By collecting the block copolymer (A) containing the triblock copolymer component (A3) from the solution containing the triblock copolymer component (A3) prepared in step (3a), the block copolymer (A) containing the triblock copolymer component (A3) can be obtained. Step (4a) is similar to step (4) described above, and the same conditions can be employed.

In the case where the block copolymer (A) contains the aromatic vinyl-conjugated diene diblock copolymer component (A1) represented as Ar-D and an aromatic vinyl-conjugated diene-aromatic vinyl branched block copolymer component (A4) represented as (Ar-D)$_n$-X (n is 3 or more), a trifunctional coupling agent can be used in step (3) in the producing method having steps (1) to (4) described above instead of the bifunctional coupling agent.

Examples of trifunctional coupling agents include trifunctional halogenated alkanes such as trichloroethane and trichloropropane; trifunctional halogenated silanes such as methyltrichlorosilane and ethyltrichlorosilane; trifunctional alkoxysilanes such as methyltrimethoxysilane, phenyltrimethoxysilane, and phenyltriethoxysilane; and the like. Examples of tetrafunctional coupling agents include tetrafunctional halogenated alkanes such as carbon tetrachloride, carbon tetrabromide, and tetrachloroethane; tetrafunctional halogenated silanes such as tetrachlorosilane and tetrabromosilane; tetrafunctional alkoxysilanes such as tetramethoxysilane and tetraethoxysilane; tetrafunctional halogenated tins such as tetrachlorotin and tetrabromotin; and the like. Examples of pentafunctional coupling agents include 1,1,1, 2,2-pentachloroethane, perchloroethane, pentachlorobenzene, perchlorobenzene, octabromodiphenyl ether, decabromodiphenyl ether, and the like. One of these coupling agents may be used alone, or two or more of them may be used in combination.

<Pellet-Shaped Article of Block Copolymer (A)>

The pellet-shaped article of the block copolymer (A) used herein can be obtained by pelletizing the block copolymer (A) described above. Pelletizing can be performed using a conventionally known method. Examples of such methods include a method of extruding the block copolymer (A) into a strand from a single screw extruder or a twin screw extruder, and cooling it with water or air, then cutting it by a strand cutter; a method of installing a rotary blade on the front surface of a die part of the single screw extruder or the twin screw extruder to cut the strand-shaped block copolymer (A) in a water stream or in water immediately after being extruded from the die; a method of melt-mixing the block copolymer (A) with an open roll and a Bumbary mixer, then shaping it into a sheet with a roll, further cutting the sheet into strips and then cutting them into cubic pellets with a pelletizer; and the like. The size and the shape of the pellet-shaped article of the block copolymer (A) are not particularly limited.

The pellet-shaped article of the block copolymer (A) may be a shaped article in a crumb shape as well as a shaped article in a pellet shape.

The pellet-shaped article of the block copolymer (A) preferably contains a polystyrene polymer in addition to the block copolymer (A) described above. The pellet-shaped article containing the polystyrene polymer in addition to the block copolymer (A) can provide enhanced block resistance.

The polystyrene polymer may be any polymer that is constituted of repeating units which are mainly styrene units obtained by polymerizing styrene. The content of styrene units in the polystyrene polymer is preferably 80 wt % or more, more preferably 90 wt % or more, particularly preferably substantially 100 wt % or more.

The polystyrene polymer may contain monomer units other than the styrene units. Examples of such monomers include aromatic vinyl monomers other than styrene, monomers other than aromatic vinyl monomers, and the like. Examples of the aromatic vinyl monomers other than styrene include styrene compounds having an alkyl group as a substituent such as α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, and 5-t-butyl-2-methylstyrene; styrene compounds having a halogen atom as a substituent such as 2-chlorostyrene, 3-chlorostyrene, 4-chlorostyrene, 4-bromostyrene, and 2,4-dibromostyrene; styrene compounds having an alkyl group and a halogen atom as substituents such as 2-methyl-4,6-dichlorostyrene; vinyl naphthalene; and the like. Examples of monomers other than aromatic vinyl monomers include conjugated diene monomers such as 1,3-butadiene and isoprene (2-methyl-1,3-butadiene); α,β-unsaturated nitrile monomers such as acrylonitrile and methacrylonitrile; unsaturated carboxylic acid monomers such as acrylic acid, methacrylic acid, maleic acid, fumaric acid, and itaconic acid; unsaturated carboxylic anhydrides such as maleic anhydride, butenyl succinic anhydride, tetrahydrophthalic anhydride, and citraconic anhydride; unsaturated carboxylic acid ester monomers such as methyl acrylate, ethyl acrylate, 2-ethylhexyl acrylate, methyl methacrylate, ethyl methacrylate, and 2-ethylhexyl methacrylate; nonconjugated diene monomers preferably having 5 to 12 carbons such as 1,4-pentadiene and 1,4-hexadiene; and the like.

The content of the polystyrene polymer in the pellet-shaped article is preferably 0.5 to 5.0 parts by weight, more preferably 0.6 to 4.5 parts by weight, still more preferably 1.0 to 4.0 parts by weight with respect to 100 parts by weight of the block copolymer (A). By controlling the content of the polystyrene polymer within the above ranges, the decrease of transparency can be suppressed while the block resistance can be enhanced. Too small a content of the polystyrene polymer may lead to the difficulties of obtaining the block resistance enhancing effect. On the other hand, too large a content of the polystyrene polymer may lead to the decrease of transparency. Although the molecular weight of the polystyrene polymer is not particularly limited, the number average molecular weight (Mn) is preferably 1,000 to 500,000, more preferably 5,000 to 100,000, still more preferably 6,000 to 30,000.

A method of producing the pellet-shaped article containing the polystyrene polymer in addition to the block copolymer (A) is not particularly limited. Examples thereof include a method in which in producing the block copolymer (A), after step (1) or step (1a) described above, a polymerization terminator is added in an amount corresponding to the amount of the polystyrene polymer to be left to obtain the block copolymer (A) as a product containing the polystyrene polymer, which is then pelletized. Alternatively, a polystyrene polymer polymerized separately can be added to the block copolymer (A) and mixed together, and then the mixture can be pelletized according to the method described above.

<Hydrocarbon-Based Dusting Agent (B)>

The hydrocarbon-based dusting agent (B) used herein is famed from a hydrocarbon-based powder, and has a specific surface area of 0.50 to 3.00 m$^2$/g, a volume average particle size of 2.0 to 20 μm, a bulk density of 0.10 to 0.34 g/cm$^3$, and a melting point of 75° C. or higher.

In the present invention, a block-copolymer pellet which exhibits suppressed dusting, and has excellent block resistance, excellent transparency, and high adhesiveness to an adherend can be obtained by using the pellet-shaped article of the block copolymer (A) described above combined with such a hydrocarbon-based dusting agent (B) to obtain the block copolymer pellet, and controlling the Shore A hardness and the BET specific surface area of the block-copolymer pellet within the specific ranges described below.

The hydrocarbon-based powder constituting the hydrocarbon-based dusting agent (B) may be any hydrocarbon-based powder that is famed from a hydrocarbon-based compound, and is not particularly limited. From the viewpoint of enhancing the advantageous effects of the present invention, the hydrocarbon-based powder is preferably a powder formed from substantially only carbon and hydrogen, more preferably a polyolefin-based powder such as polyethylene or polypropylene.

The hydrocarbon-based dusting agent (B) used herein has a BET specific surface area of 0.50 to 3.00 m$^2$/g, preferably 0.8 to 2.5 m$^2$/g, more preferably 1.0 to 2.3 m$^2$/g. Too small a BET specific surface area may result in a block-copolymer pellet having poor block resistance. On the other hand, too large a BET specific surface area may easily cause dusting. The BET specific surface area of the hydrocarbon-based dusting agent (B) can be determined by a Kr adsorption method, namely, by measuring the gas adsorption amount by a volume method using krypton (Kr) gas as an adsorption gas, and calculating the specific surface area by the BET method. In the case where two or more dusting agents different in BET specific surface area are used as the dusting agent (B), a selection can be made such that the average value of their BET specific surface areas determined in view of the amounts of the two or more dusting agents to be compounded falls within the above ranges.

The hydrocarbon-based dusting agent (B) used herein has a volume average particle size of 2.0 to 20 µm, preferably 5 to 19 µm, more preferably 8 to 18 µm. Too small a volume average particle size may easily cause dusting. On the other hand, too large a volume average particle size may result in a block-copolymer pellet having poor block resistance. The volume average particle size of the hydrocarbon-based dusting agent (B) can be determined by dispersing the hydrocarbon-based dusting agent (B) in isopropanol and measuring by a laser diffraction scattering particle size distribution measuring device. In the case where two or more dusting agents different in volume average particle size are used as the dusting agent (B), a selection can be made such that the average value of their volume average particle sizes determined in view of the amounts of the two or more dusting agents to be compounded falls within the above ranges.

The hydrocarbon-based dusting agent (B) used herein has a bulk density of 0.10 to 0.34 g/cm$^3$, preferably 0.12 to 0.30 g/cm$^3$, more preferably 0.16 to 0.26 g/cm$^3$. Too small a bulk density of the hydrocarbon-based dusting agent (B) may result in a block-copolymer pellet easily causing dusting and having poor block resistance. On the other hand, too large a bulk density of the hydrocarbon-based dusting agent (B) may result in a block-copolymer pellet having poor block resistance. In the case where two or more dusting agents different in bulk density are used as the dusting agent (B), a selection can be made such that the average value of their bulk densities determined in view of the amounts of the two or more dusting agents to be compounded falls within the above ranges.

The hydrocarbon-based dusting agent (B) used herein has a melting point of 75° C. or higher, preferably 90 to 170° C., more preferably 100 to 170° C. Too low a melting point of the hydrocarbon-based dusting agent (B) may result in a block-copolymer pellet having poor block resistance.

From the viewpoint of enhancing the block resistance of the resulting block-copolymer pellet, the hydrocarbon-based dusting agent (B) used herein preferably contains 3 to 40 vol % of particles having a particle size of 20 or more, more preferably contains 5 to 25 vol % of particles having a particle size of 20 µm or more. The content of particles having a particle size of 20 µm or more in the hydrocarbon-based dusting agent (B) can be determined by dispersing the hydrocarbon-based dusting agent (B) in isopropanol and measuring by a laser diffraction scattering particle size distribution measuring device. In the case where two or more dusting agents are used as the dusting agent (B), a selection can be made such that the content of particles having a particle size of 20 µm or more to the total amount of the two or more dusting agents falls within the above ranges.

<Block-Copolymer Pellet>

The block-copolymer pellet according to the present invention contains 100 parts by weight of the pellet-shaped article of the block copolymer (A) described above and 0.01 to 5 parts by weight of the hydrocarbon-based dusting agent (B) described above, and has a Shore A hardness of 10 to 80, and a BET specific surface area of 0.001 to 0.05 m$^2$/g measured by the Kr adsorption method.

According to the present invention, a block-copolymer pellet which exhibits suppressed dusting, and has excellent block resistance, excellent transparency, and high adhesiveness to an adherend can be obtained by combining the pellet-shaped article of the block copolymer (A) described above with the hydrocarbon-based dusting agent (B) described above to obtain the block-copolymer pellet, and controlling the Shore A hardness and the BET specific surface area of the block-copolymer pellet within the above ranges.

In the block-copolymer pellet according to the present invention, the amount of the hydrocarbon-based dusting agent (B) is 0.01 to 5 parts by weight, preferably 0.05 to 4.2 parts by weight, still more preferably 0.1 to 3.2 parts by weight, further still more preferably 0.2 to 0.5 parts by weight with respect to 100 parts by weight of the block-copolymer pellet. Too small an amount of the hydrocarbon-based dusting agent (B) may result in a block-copolymer pellet having poor block resistance. On the other hand, too large an amount of the hydrocarbon-based dusting agent (B) may result in a block-copolymer pellet causing a high amount of dusting.

A method of mixing the pellet-shaped article of the block copolymer (A) with the hydrocarbon-based dusting agent (B) is not particularly limited. Examples thereof include a method of mixing the both by a mixer such as a tumbler; a method of dispersing the hydrocarbon-based dusting agent (B) in water using a surfactant as required to prepare an aqueous dispersion, and bringing the aqueous dispersion of the hydrocarbon-based dusting agent (B) into contact with the pellet-shaped article of the block copolymer (A); a method of adding an aqueous dispersion of the hydrocarbon-based dusting agent (B) prepared as described above to the cooling water in the step of extruding the block copolymer (A) into a strand from an extruder, cooling it with water, and then cutting it with a strand cutter; and the like. A treatment temperature in this method is preferably 5 to 50° C., more preferably 10 to 30° C.

The Shore A hardness of the block-copolymer pellet according to the present invention is 10 to 80, preferably 20 to 70, more preferably 25 to 67, further still more preferably 30 to 65. Too low a Shore A hardness may result in poor block resistance. On the other hand, too high a Shore A hardness may result in a failure of obtaining a good adhesive property. The Shore A hardness of the block-copolymer pellet can be adjusted, for example, by a method such as adjusting the monomer composition of the polymer components constituting the block copolymer (A) or adjusting the composition of the diblock polymer and the triblock polymer.

Furthermore, the BET specific surface area of the block-copolymer pellet according to the present invention is 0.001 to 0.05 m$^2$/g, preferably 0.005 to 0.04 m$^2$/g, more preferably 0.01 to 0.03 m$^2$/g, measured by the Kr adsorption method. Too small a BET specific surface area of the block-copolymer pellet may result in poor block resistance. On the other hand, too large a BET specific surface area may result in poor block resistance. The BET specific surface area of the block-copolymer pellet can be determined by the Kr adsorption method, namely, by measuring the gas adsorption amount by a volume method using krypton (Kr) gas as an adsorption gas, and calculating the specific surface area by the BET method. The BET specific surface area of the block-copolymer pellet can be adjusted, for example, by a method such as adjusting the BET specific surface area of the hydrocarbon-based dusting agent (B) or adjusting the resin temperature during pelletizing the block copolymer (A) by melt extrusion molding.

<Adhesive Composition>

The adhesive composition according to the present invention is obtained using the block-copolymer pellet described above. The adhesive composition according to the present invention has an excellent adhesive property to an adherend because the adhesive composition is obtained using the block-copolymer pellet described above.

Although it is only required that the adhesive composition according to the present invention is obtained using the block-copolymer pellet described above, the adhesive composition may be obtained by using a tackifying resin in addition to the block-copolymer pellet described above.

The tackifying resin can be any tackifying resin commonly used in adhesive compositions and is not particularly limited. For example, any of rosin, modified rosins such as disproportionated rosin and dimerized rosin, esterified products of polyhydric alcohols such as glycol, glycerin, and pentaerythritol and rosin or modified rosins, terpene resins, aliphatic hydrocarbon resins such as petroleum resins, aromatic hydrocarbon resins, alicyclic hydrocarbon resins, or aliphatic-aromatic copolymer hydrocarbon resins, or hydrides thereof, phenol resins, coumarone-indene resins, and the like can be used as the tackifying resin. Among these, aliphatic hydrocarbon resins, aromatic hydrocarbon resins, alicyclic hydrocarbon resins, or aliphatic-aromatic copolymer hydrocarbon resins, or hydrides thereof are suitably used.

The ratio of the block-copolymer pellet and the tackifying resin to be compounded can be appropriately adjusted according to the application of the adhesive composition. The amount of the tackifying resin to be compounded is preferably 5 to 6000 parts by weight, more preferably 40 to 4500 parts by weight with respect to 100 parts by weight of the block-copolymer pellet.

The adhesive composition according to the present invention can contain a variety of additives such as softeners, plasticizer, antioxidants, fillers, and lubricants as required.

The adhesive composition according to the present invention can be prepared by a method similar to a method for a common adhesive composition. For example, an adhesive solution can be obtained by stirring and mixing the block-copolymer pellet, the tackifying resin, and an additive used as required in the presence of a solvent. The adhesive solution thus obtained generally can be applied uniformly to a desired base material using an applicator, and dried, and then wound to be a wide variety of adhesive tape or adhesive label products. Alternatively, the block-copolymer pellet, the tackifying resin, and an additive used as required can be charged into a melting pot simultaneously or sequentially from the one having the lowest viscosity, and heated to be melt-mixed at 100 to 200° C., and then processed into an appropriate shape such as a block shape, rod shape, powder shape, film shape, and sheet shape, or a continuous production is possible by using a single screw or a twin screw extruder.

<Stretch Film>

The stretch film according to the present invention is a stretchable film obtained using the block-copolymer pellet described above. The stretch film according to the present invention has good stretchability because the stretch film is obtained using the block-copolymer pellet described above.

The stretch film according to the present invention may contain a polymer component other than the block-copolymer pellet described above or an additive. Examples of polymer components other than the block-copolymer pellet described above include olefin-based resins such as polyethylene and polypropylene, styrene-based resins such as polystyrene and impact-resistant polystyrene, and the like. Additional examples of polymer components other than the block-copolymer pellet described above include conjugated diene homopolymers, aromatic vinyl-conjugated diene random copolymers, and branched polymers thereof; thermoplastic elastomers such as polyurethane-based thermoplastic elastomers, polyamide-based thermoplastic elastomers, and polyester-based thermoplastic elastomers; thermoplastic resins such as polyvinyl chloride, acrylonitrile-styrene copolymer, acrylonitrile-butadiene-styrene copolymer, and polyphenylene ether; and the like.

The stretch film according to the present invention can contain a variety of additives such as antioxidants, tackifying resins, softeners, antimicrobial agents, photostabilizers, ultraviolet absorbing agents, dyes, pigments, and lubricants as required.

A method of mixing the block-copolymer pellet described above with the other components is not particularly limited. For example, after compounding the other polymer components and the additives to the block-copolymer pellet described above as required, they can be mixed according to a conventional method such as kneading or solution mixing. Specific examples thereof include a method of dissolving and homogeneously mixing the components in a solvent, and then removing the solvent by heating and the like, and a method of melt-mixing the components by a screw extruder, a kneader, or the like. Among these, the melt-mixing is suitable from the viewpoint of mixing more effectively. Although the temperature during the melt-mixing is not particularly limited, the temperature is generally in the range of 100 to 200° C.

The stretch film can have any thickness without limitation, and can be adjusted according to the application. For example, in the case where the stretch film is used in hygiene products such as paper diapers and sanitary products, the thickness of the stretch film is generally 0.01 to 5 mm, preferably 0.01 to 1 mm, more preferably 0.02 to 0.2 mm.

A method of shaping the block-copolymer pellet described above into a film is not particularly limited, and a conventionally known method of shaping a film can be applied. From the viewpoint of preparing a smooth film with good productivity, extrusion molding is suitable, and among others, extrusion molding using a T-die is particularly suitable. Specific examples of the extrusion molding using the T-die include a method in which a composition for film melted at 150 to 250° C. is extruded from a T-die mounted to a single screw extruder or a twin screw extruder, and wound while being cooled by a winding roll. The film may be extended during being cooled by the winding roll. Further, the film to be wound may be formed by applying a melted product of the composition for film containing the block-copolymer pellet onto a base material famed from polyethylene terephthalate, polyethylene, polypropylene, a nonwoven fabric, or releasing paper, or may be formed by sandwiching the melted product of the composition for film containing the block-copolymer pellet with such base materials. The film thus obtained may be used integrally with the base material as it is, or may be used after being peeled off from the base material.

The stretch film according to the present invention can be used as a single-layer film, or can be laminated with another member to be used as a multi-layer body according to its application. Specific examples of use as a single-layer film can include applications as a stretch film used in hygiene products such as paper diapers and sanitary products, a protective film for protecting an optical film, and a heat-shrinkable film used as a shrink wrapping of a container or a heat-shrink label. Specific examples of the cases of the multi-layer body can include a case where the film according to the present invention is slit, and a hot melt adhesive or the like is applied to the slit to form a tape, and the tape is contracted and bonded to a nonwoven fabric, a woven fabric, a plastic film, or a laminate thereof, and the shrinkage of the tape is eased to form a stretchable gather member. Furthermore, according to other applications, the stretch film can be appropriately processed according to known methods for applications such as stretchable members such as base materials for stretchable compresses, gloves, surgical gloves, fingerstalls, hemostatic bands, contraceptives, headbands, goggles bands, and rubber bands.

EXAMPLES

Hereinafter, the present invention will be described further specifically by way of Examples and Comparative Examples, but the present invention is not limited to only these Examples. The "part(s)" and "%" are based on weight unless otherwise specified.

The test methods performed in Examples and Comparative Examples are as follows.

[Weight Average Molecular Weight]

The weight average molecular weight was determined by high-performance liquid chromatography using tetrahydrofuran at a flow rate of 0.35 ml/min as a carrier, and determined as a polystyrene-equivalent molecular weight. The apparatus used was HLC 8320 available from TOSOH CORPORATION, the columns used were three connected Shodex (registered trademark) KF-404HQ columns available from SHOWA DENKO K.K. (column temperature: 40° C.), and the detectors used were a differential refractometer and an ultraviolet detector. Molecular weight was calibrated at 12 points using polystyrene standards (from 500 to 3,000,000) available from POLYMER LABORATORIES LTD.

[Weight Ratio of Each Block Copolymer Component in Block Copolymer]

The weight ratio of each block copolymer component in the block copolymer was determined from an area ratio of the peak corresponding to each block copolymer in a chart obtained by high-performance liquid chromatography.

[Weight Average Molecular Weight of Styrene Polymer Block in Each Polymer Component]

According to the method described in Rubber Chem. Technol., 45, 1295 (1972), each block copolymer was reacted with ozone and reduced with lithium aluminum hydride, decomposing an isoprene polymer block of the block copolymer.

Specifically, this procedure was performed as follows. That is, 300 mg of a sample was dissolved in a reaction vessel containing 100 ml of dichloromethane treated with a molecular sieve. After this reaction vessel was placed in a cooling tank to be −25° C., the ozone generated by an ozone generator was introduced while oxygen was being supplied to the reaction vessel at a flow rate of 170 ml/min. After 30 minutes from the start of the reaction, the completion of the reaction was confirmed by introducing a gas flowing out of the reaction vessel into a potassium iodide aqueous solution. Next, 50 ml of diethyl ether and 470 mg of lithium aluminum hydride were charged into another reaction vessel purged with nitrogen, and the solution reacted with ozone was slowly added dropwise to this reaction vessel while cooling the reaction vessel with ice water. Then, the reaction vessel was placed in a water bath, gradually heated, and refluxed at 40° C. for 30 minutes. Thereafter, dilute hydrochloric acid was added dropwise in small portions to the reaction vessel while stirring the solution, and the dropwise addition was continued until almost no generation of hydrogen was observed. After this reaction, the solid product generated in the solution was filtered off, and the solid product was extracted with 100 ml of diethyl ether for 10 minutes. The extracted liquid was combined with the filtrate obtained by the filtration, and the solvent was distilled off to obtain a solid sample. For the sample thus obtained, the weight average molecular weight was measured according to the above method for measuring the weight average molecular weight, and the value was defined as the weight average molecular weight of a styrene polymer block.

[Weight Average Molecular Weight of Isoprene Polymer Block in Each Polymer Component]

From the weight average molecular weight of each block copolymer determined as described above, the weight average molecular weight of the corresponding styrene block determined as described above was subtracted, and from the calculated value, the weight average molecular weight of the isoprene polymer block was determined.

[Content of Styrene Units in Each Polymer Component]

The content of styrene units in each polymer component was determined based on the ratio of detection intensities of the differential refractometer and the ultraviolet detector in the measurement by high-performance liquid chromatography described above. Copolymers having a different content of styrene units were prepared beforehand, and a calibration curve was created using them.

[Content of Styrene Units in Block Copolymer]

The content of styrene units in the block copolymer was determined based on a measurement by $^1$H-NMR.

[Content of Vinyl Bonds in Isoprene Polymer Block]

The content of vinyl bonds in the isoprene polymer block was determined based on a measurement by $^1$H-NMR.

[Shore a Hardness of Block-Copolymer Pellet]

Shore A hardness of a block-copolymer pellet was determined in accordance with ISO 7619. The details are as follows.

15 g of the block-copolymer pellet was charged into a press molding machine set at a temperature of 170° C., and pre-melted for 1 minute under 0.1 to 0.5 MPa pressurization, and then pressurized at 20 MPa to be shaped into a sheet. This operation was repeated two to three times to obtain a homogeneous sheet.

The sheet obtained was folded into a size of 4 cm×4 cm, and again charged into the press molding machine using a molding frame having a thickness of 2 mm, and pre-melted for 1 minute under 0.1 to 0.5 MPa pressurization, and then pressurized at 10 MPa to be shaped into a plate having a thickness of 2 mm.

The plate sample obtained was cut into pieces with a size of 3 cm×4 cm, three of which were laminated to be a sample for a hardness measurement.

A durometer (type A) was used for the measurement. The sample for the hardness measurement was placed on a predetermined position, and the measurement needle was slowly lowered onto the sample. An indicated value was read 10 seconds after the needle was lowered. The measurement was performed at five different measured locations, and their average value was calculated.

[BET Specific Surface Area of Block-Copolymer Pellet]

The BET specific surface area of the block-copolymer pellet was determined by measuring the gas adsorption amount by a volume method using krypton (Kr) gas as an adsorption gas, and calculating the specific surface area by the BET method.

<Block Resistance of Block-Copolymer Pellet>

The block resistance of each block-copolymer pellet was measured by placing 50 g of the block-copolymer pellet in a plastic bag having a size of 100 mm×100 mm, tightly sealing the opening of the bag with a cellophane tape, placing and leaving the bag in an oven set at 60° C. for 10 hours with a SUS plate and a 5 kg weight on top of that, and visually determining the presence or absence of blocking of pellets.

A: The area occupied by a blocking part is 0% of the total area.

B: The area occupied by a blocking part is greater than 0% and 10% or less of the total area.

C: The area occupied by a blocking part is greater than 10% and 20% or less of the total area.

F: The area occupied by a blocking part is greater than 20% of the total area.

[Dusting of Block-Copolymer Pellet]

3 kg of each block-copolymer pellet was sealed in a polyethylene bag, and shaken 30 times. A transparent acrylic case having an openable and closable lid (length: 30 cm, width: 10 cm, height: 10 cm) was then placed in the bag described above, and the gas layer was collected in the acrylic case.

A white paper on which a cross letter printed was placed on a laboratory bench, and on top of that, the acrylic case was placed such that its lengthwise direction corresponded to the vertical direction. The cross letter was visually observed through the acrylic case to evaluate the degree of dusting according to whether the outline could be clearly identified or not.

A: The outline can be identified clearly (a small amount of dusting).

F: The outline cannot be identified clearly (a large amount of dusting).

[Transparency of Block-Copolymer Pellet]

The transparency of each block-copolymer pellet was determined by creating a press sheet having a thickness of 1 mm and using an ultraviolet-visible spectrophotometer at a light transmittance of 550 nm.

A: Transmittance≥70%

F: Transmittance<70%

[Odor of Block-Copolymer Pellet]

The odor of each block-copolymer pellet was evaluated by a sensory test. Specifically, 50 g of the block-copolymer pellet was placed in a 300 ml heat-resistant vessel, and the vessel was covered with an aluminium foil. Then, this heat-resistant vessel containing the block-copolymer pellet was placed in an oven to be heated at a temperature of 150° C. for 30 minutes. The odor after heating was observed. The odor was observed by a panel of six persons who were not used to odors of organic compounds (in other words, they would not experience odors of organic compounds in their regular lives), and was evaluated according to the following criteria.

0: No odor
1: Odor barely sensed
2: Weak odor, the type of odor recognized
3: Odor easily sensed
4: Strong odor
5: Very strong odor The average value of the values from the panel of six persons was determined, and evaluated according to the following criteria.

A: Odor intensity<3
F: Odor intensity≥3

[Peeling Adhesive Strength of Adhesive Composition (N/25 mm)]

For an adhesive sheet prepared using the adhesive composition, the peeling adhesive strength (N/25 mm) was measured in accordance with PSTC-1 (180° peeling adhesion test specified by Adhesive Tape Council of the United States)) at 23° C. using a polyethylene base material as an adherend, and evaluated according to the following criteria.

A: Peeling adhesive strength of 2.0 N/25 mm or more
F: Peeling adhesive strength less than 2.0 N/25 mm Production Example 1

(Production of Block Copolymer (A-1))

To a pressure-resistant reactor, 23.3 kg of cyclohexane, 1.5 mmol of N,N,N',N'-tetramethylethylenediamine (hereinafter referred to as TMEDA) and 1.2 kg of styrene were added and stirred at 40° C. During stirring, 101.7 mmol of n-butyllithium was added, and polymerization was performed for 1 hour while raising the temperature to 50° C. The polymerization conversion of styrene was 100%. Subsequently, 6.53 kg of isoprene was continuously added to the reactor over 1 hour while controlling the temperature so as to maintain 50 to 60° C. After completing the addition of isoprene, polymerization was continued for an additional hour. A styrene-isoprene diblock copolymer component represented by Ar-D was formed. The polymerization conversion of isoprene was 100%. Next, 37.6 mmol of dimethyldichlorosilane was added as a coupling agent, and coupling was performed for 2 hours to form a styrene-isoprene-styrene triblock copolymer component represented by (Ar-D)$_2$-X. Thereafter, 203 mmol of methanol was added as a polymerization terminator, and mixed well to stop the reaction. The amount of each reagent used in the reaction is summarized in Table 1. A portion of the reaction solution obtained was separated, and the weight average molecular weights of each block copolymer component and the total block copolymer, the weight ratio of each block copolymer components to the block copolymer, the weight average molecular weight of each styrene polymer block, the weight average molecular weight of each isoprene polymer block, the content of styrene units in each block copolymer component, the content of styrene units in the total block copolymers, and the content of vinyl bonds in the isoprene polymer block were determined. These values are shown in Table 2. To 100 parts of the reaction solution (containing 30 parts of the polymer components) obtained as described above, 0.3 parts of 2,6-di-tert-butyl-p-cresol was added as an antioxidant and mixed, and the mixed solution was added dropwise in small portions to warm water heated to 85 to 95° C. to volatilize the solvent to obtain a precipitate. The precipitate was pulverized, and dried with hot air at 85° C. to collect a block copolymer (A-1) of Production Example 1. The melt index of the block copolymer (A-1) obtained was measured. The value of the melt index is shown in Table 2.

Production Example 2

(Production of Block Copolymer (A-2))

A block copolymer (A-2) of Production Example 2 was obtained in the same manner as in Production Example 1 except that the amounts of styrene, n-butyllithium, TMEDA, isoprene, dimethyldichlorosilane, and methanol were changed as shown in Table 1, respectively. The measurements for the block copolymer (A-2) of Production Example 2 were pertained in the same manner as the measurements in Production Example 1. The results are shown in Table 2.

Production Example 3

(Production of Block Copolymer (A-3))

A block copolymer (A-3) of Production Example 3 was obtained in the same manner as in Production Example 1 except that the amounts of styrene, n-butyllithium, TMEDA, isoprene, and methanol were changed as shown in Table 1, respectively, and that 27.6 mmol of tetramethoxysilane was used instead of dimethyldichlorosilane. The measurements for the block copolymer (A-3) of Production Example 3 were performed in the same manner as the measurements in Production Example 1. The results are shown in Table 2.

Production Example 4

(Production of Block Copolymer (A-4))

A block copolymer (A-4) of Production Example 4 was obtained in the same manner as in Production Example 1 except that the amounts of styrene, n-butyllithium, TMEDA, isoprene, dimethyldichlorosilane, and methanol were changed as shown in Table 1, respectively. The measurements for the block copolymer (A-4) of Production Example 4 were performed in the same manner as the measurements in Production Example 1. The results are shown in Table 2.

Production Example 5

(Production of Block Copolymer (A-5))

To a pressure-resistant reactor, 23.3 kg of cyclohexane, 1.3 mmol of N,N,N',N'-tetramethylethylenediamine (hereinafter referred to as TMEDA) and 1.08 kg of styrene were added and stirred at 40° C. During stirring, 87.0 mmol of n-butyllithium was added, and polymerization was performed for 1 hour while raising the temperature to 50° C. The polymerization conversion of styrene was 100%. Subsequently, 5.57 kg of isoprene was continuously added to the reactor over 1 hour while controlling the temperature so as to maintain 50 to 60° C. After completing the addition of isoprene, polymerization was continued for an additional hour. A styrene-isoprene diblock copolymer component represented by Ar-D was formed. The polymerization conversion of isoprene was 100%. Next, 1.08 kg of styrene was continuously added to the reactor over 1 hour while controlling the temperature so as to maintain 50 to 60° C. After completing the addition of styrene, polymerization was continued for an additional hour. A styrene-isoprene-styrene diblock copolymer component represented by Ar-D-Ar was famed. Thereafter, 174 mmol of methanol was added as a polymerization terminator, and mixed well to stop the reaction. The amount of each reagent used in the reaction is summarized in Table 1. Then, a portion of the reaction solution obtained was separated, and subjected to each measurement in the same manner as in Production Example 1. These values are shown in Table 2. To 100 parts of the reaction solution (containing 30 parts of the polymer components) obtained as described above, 0.3 parts of 2,6-di-tert-butyl-p-cresol was added as an antioxidant and mixed, and the mixed solution was added dropwise in small portions to warm water heated to 85 to 95° C. to volatilize the solvent to obtain a precipitate. The precipitate was pulverized, and dried with hot air at 85° C. to collect a block copolymer (A-5) of Production Example 5. The melt index of the resulting block copolymer (A-5) was measured. The value of the melt index is shown in Table 2.

TABLE 1

|  |  | Preparation Example 1 (A-1) | Preparation Example 2 (A-2) | Preparation Example 3 (A-3) | Preparation Example 4 (A-4) | Preparation Example 5 (A-5) |
| --- | --- | --- | --- | --- | --- | --- |
| Cyclohexane (Kg) |  | 23.2 | 23.2 | 23.2 | 23.2 | 23.2 |
| TMEDA (mmol) |  | 1.5 | 1.1 | 2.1 | 1.5 | 1.3 |
| n-Butyllithium (mmol) |  | 101.7 | 70.3 | 138.0 | 99.1 | 87.0 |
| Styrene (Kg) | [First stage of polymerization] | 1.2 | 1.28 | 1.24 | 1.70 | 1.08 |
| Isoprene (Kg) | [Second stage of polymerization] | 6.53 | 6.45 | 6.49 | 6.03 | 5.57 |
| Dimethyldichlorosilane (mmol) | [After second stage of polymerization] | 37.6 | 7.7 | — | 15.0 | — |
| Tetramethoxysilane (mmol) | [After second stage of polymerization] | — | — | 27.6 | — | — |
| Styrene (Kg) | [Third stage of polymerization] | — | — | — | — | 1.08 |
| Methanol (mmol) | [Before completion of polymerization] | 203 | 141 | 276 | 198 | 174 |

TABLE 2

|  |  | Preparation Example 1 (A-1) | Preparation Example 2 (A-2) | Preparation Example 3 (A-3) | Preparation Example 4 (A-4) | Preparation Example 5 (A-5) |
| --- | --- | --- | --- | --- | --- | --- |
| Styrene-isoprene-styrene triblock copolymer component | | | | | | |
| Weight average molecular weight | [×10$^3$] | 220 | 308 | — | 218 | 120 |
| Weight average molecular weight of styrene block | [×10$^3$] | 12 | 18 | — | 17 | 12 |
| Content of styrene units | [wt %] | 15.5 | 16.5 | — | 22 | 28 |
| Content of vinyl bonds | [wt %] | 7 | 7 | — | 7 | 7 |
| Weight average molecular weight Mw of isoprene block | [×10$^3$] | 189 | 272 | — | 184 | 96 |
| Styrene-isoprene diblock copolymer component | | | | | | |
| Weight average molecular weight | [×10$^3$] | 110 | 154 | 77 | 109 | — |
| Weight average molecular weight of styrene block | [×10$^3$] | 12 | 18 | 9 | 17 | — |

TABLE 2-continued

|  |  | Preparation Example 1 (A-1) | Preparation Example 2 (A-2) | Preparation Example 3 (A-3) | Preparation Example 4 (A-4) | Preparation Example 5 (A-5) |
|---|---|---|---|---|---|---|
| Content of styrene units | [wt %] | 15.5 | 16.5 | 16 | 22 | — |
| Content of vinyl bonds | [wt %] | 7 | 7 | 7 | 7 | — |
| Weight average molecular weight Mw of isoprene block | [×10³] | 98 | 136 | 68 | 92 | — |
| Styrene-isoprene-styrene tri-branched block copolymer component | | | | | | |
| Weight average molecular weight | [×10³] | — | — | 231 | — | — |
| Content of styrene units | [wt %] | — | — | 16 | — | — |
| Content of vinyl bonds | [wt %] | — | — | 7 | — | — |
| Styrene-isoprene-styrene tetra-branched block copolymer component | | | | | | |
| Weight average molecular weight | [×10³] | — | — | 308 | — | — |
| Content of styrene units | [wt %] | — | — | 16 | — | — |
| Content of vinyl bonds | [wt %] | — | — | 7 | — | — |
| Total block copolymer | | | | | | |
| Weight average molecular weight | [×10³] | 192 | 188 | 192 | 142 | 120 |
| Content of styrene units | [wt %] | 15.5 | 16.5 | 16 | 22 | 28 |
| Content of styrene-isoprene-styrene triblock copolymer component | [wt %] | 74 | 22 | 70 | 30 | 100 |
| Melt index (g/10 min) G condition | [g/10 min] | 16 | 10 | 20 | 10 | 12 |

Example 1

The block copolymer (A-1) obtained in Production Example 1 was charged into a twin screw extruder. The discharged strands were cooled in water at 10° C., and then cut into a length of 2.5 mm by a pelletizer to obtain a pellet-shaped article of the block copolymer (A-1) having a diameter of 2.5 mm and a length of 2.5 mm. At this time, the molding temperature (resin temperature) of the twin screw extruder was 215° C.

Then, 100 parts of the pellet-shaped article of the block copolymer (A-1) obtained above and 0.3 parts of a polyethylene powder (B-1) (BET specific surface area: 1.249 m²/g, volume average particle size: 2.5 μm, bulk density: 0.13 g/cm³, melting point: 93° C., the content of particles having a particle size of 20 μm or more: 0 vol %) were used and stirred for 2 minutes at room temperature by a Henschel mixer to obtain a block-copolymer pellet. The BET specific surface area of the polyethylene powder (B-1) was measured by a Kr adsorption method. The content of particles having a volume average particle size and a particle size of 20 μm or more were determined by measurement by a laser diffraction scattering particle size distribution measuring device (the same applies to the following Examples and Comparative Examples). Then, the Shore A hardness, BET specific surface area, block resistance, dusting, transparency, and odor of the block-copolymer pellet obtained were measured and evaluated according to the above methods. The results are shown in Table 3.

50 parts of the block-copolymer pellet obtained above, 50 parts of a petroleum resin (product name "Quintone R100", available from ZEON CORPORATION), and 10 parts of oil (product name "Napthne oil N100", available from JAPAN SUN OIL COMPANY, LTD.) were kneaded at 180° C. for 1 hour to obtain an adhesive composition. Then, the adhesive composition obtained was melt-coated on a PET film having a thickness of 25 μm to a thickness of 20 μm to produce an adhesive sheet, and the peeling adhesive strength was measured according to the above method. The results are shown in Table 3.

Example 2

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 160° C.

Then, using 100 parts of the pellet-shaped article of the block copolymer (A-1) thus obtained, a block-copolymer pellet and an adhesive sheet were produced and evaluated in the same manner as in Example 1 except that 0.3 parts of a polypropylene powder (B-2) (BET specific surface area: 0.845 m²/g, volume average particle size: 5.5 μm, bulk density: 0.14 g/cm³, melting point: 155° C., the content of particles having a particle size of 20 μm or more: 0 vol %) were used instead of 0.3 parts of the polyethylene powder (B-1). The results are shown in Table 3.

Example 3

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 230° C.

Then, using 100 parts of the pellet-shaped article of the block copolymer (A-1) thus obtained, a block-copolymer pellet and an adhesive sheet were produced and evaluated in the same manner as in Example 1 except that 0.3 parts of a polyethylene powder (B-3) (BET specific surface area: 2.228 m²/g, volume average particle size: 8.5 μm, bulk density: 0.25 g/cm³, melting point: 124° C., the content of particles having a particle size of 20 μm or more: 1.0 vol %) were used instead of 0.3 parts of the polyethylene powder (B-1). The results are shown in Table 3.

Example 4

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 200° C.

Then, using 100 parts of the pellet-shaped article of the block copolymer (A-1) thus obtained, a block-copolymer pellet and an adhesive sheet were produced and evaluated in the same manner as in Example 1 except that 0.3 parts of a polypropylene powder (B-4) (BET specific surface area: 1.523 m²/g, volume average particle size: 9.5 μm, bulk density: 0.29 g/cm³, melting point: 145° C., the content of particles having a particle size of 20 μm or more: 2.5 vol %) were used instead of 0.3 parts of the polyethylene powder (B-1). The results are shown in Table 3.

Example 5

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 240° C.

Then, using 100 parts of the pellet-shaped article of the block copolymer (A-1) thus obtained, a block-copolymer pellet and an adhesive sheet were produced and evaluated in the same manner as in Example 1 except that 0.3 parts of a polypropylene powder (B-5) (BET specific surface area: 0.958 m²/g, volume average particle size: 18 μm, bulk density: 0.25 g/cm³, melting point: 116° C., the content of particles having a particle size of 20 μm or more: 45.0 vol %) were used instead of 0.3 parts of the polyethylene powder (B-1). The results are shown in Table 3.

Comparative Example 1

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 210° C.

Then, using 100 parts of the pellet-shaped article of the block copolymer (A-1) thus obtained, a block-copolymer pellet and an adhesive sheet were produced and evaluated in the same manner as in Example 1 except that 0.3 parts of a polyethylene powder (B-6) (BET specific surface area: 1.499 m²/g, volume average particle size: 2.7 μm, bulk density: 0.08 g/cm³, melting point: 140° C., the content of particles having a particle size of 20 μm or more: 0 vol %) were used instead of 0.3 parts of the polyethylene powder (B-1). The results are shown in Table 3.

Comparative Example 2

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 170° C.

Then, using 100 parts of the pellet-shaped article of the block copolymer (A-1) thus obtained, a block-copolymer pellet and an adhesive sheet were produced and evaluated in the same manner as in Example 1 except that 0.3 parts of a polyethylene powder (B-7) (BET specific surface area: 3.539 m²/g, volume average particle size: 3.5 μm, bulk density: 0.11 g/cm³, melting point: 93° C., the content of particles having a particle size of 20 μm or more: 0 vol %) were used instead of 0.3 parts of the polyethylene powder (B-1). The results are shown in Table 3.

Comparative Example 3

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 180° C.

Then, using 100 parts of the pellet-shaped article of the block copolymer (A-1) thus obtained, a block-copolymer pellet and an adhesive sheet were produced and evaluated in the same manner as in Example 1 except that 0.3 parts of a polyethylene powder (B-8) (BET specific surface area: 0.432 m²/g, volume average particle size: 110 μm, bulk density: 0.33 g/cm³, melting point: 153° C., the content of particles having a particle size of 20 μm or more: 100 vol %) were used instead of 0.3 parts of the polyethylene powder (B-1). The results are shown in Table 3.

Comparative Example 4

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 240° C.

Then, using 100 parts of the pellet-shaped article of the block copolymer (A-1) thus obtained, a block-copolymer pellet and an adhesive sheet were produced and evaluated in the same manner as in Example 1 except that 0.3 parts of a polyethylene powder (B-9) (BET specific surface area: 0.330 m²/g, volume average particle size: 480 μm, bulk density: 0.39 g/cm³, melting point: 138° C., the content of particles having a particle size of 20 μm or more: 100 vol %) were used instead of 0.3 parts of the polyethylene powder (B-1). The results are shown in Table 3.

Comparative Example 5

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 230° C.

Then, using 100 parts of the pellet-shaped article of the block copolymer (A-1) thus obtained, a block-copolymer pellet and an adhesive sheet were produced and evaluated in the same manner as in Example 1 except that 0.3 parts of a polyethylene powder (B-10) (BET specific surface area: 0.602 m²/g, volume average particle size: 8.5 μm, bulk density: 0.35 g/cm³, melting point: 153° C., the content of particles having a particle size of 20 μm or more: 1.5 vol %) were used instead of 0.3 parts of the polyethylene powder (B-1). The results are shown in Table 3.

Comparative Example 6

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 210° C.

Then, using 100 parts of the pellet-shaped article of the block copolymer (A-1) thus obtained, a block-copolymer pellet and an adhesive sheet were produced and evaluated in the same manner as in Example 1 except that 0.3 parts of a highly modified hydrocarbon compound powder (B-11) (BET specific surface area: 0.892 m²/g, volume average particle size: 8 μm, bulk density: 0.24 g/cm³, melting point: 74° C., the content of particles having a particle size of 20 μm or more: 0.5 vol %) were used instead of 0.3 parts of the polyethylene powder (B-1). The results are shown in Table 3.

Comparative Example 7

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 200° C.

Then, using 100 parts of the pellet-shaped article of the block copolymer (A-1) thus obtained, a block-copolymer pellet and an adhesive sheet were produced and evaluated in the same manner as in Example 1 except that 0.3 parts of a calcium stearate powder (B-12) (BET specific surface area: 18.44 m$^2$/g, volume average particle size: 9.7 μm, bulk density: 0.19 g/cm$^3$, melting point: 148° C., the content of particles having a particle size of 20 μm or more: 26.0 vol %) were used instead of 0.3 parts of the polyethylene powder (B-1). The results are shown in Table 3.

Comparative Example 8

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 170° C.

Then, using 100 parts of the pellet-shaped article of the block copolymer (A-1) thus obtained, a block-copolymer pellet and an adhesive sheet were produced and evaluated in the same manner as in Example 1 except that 0.3 parts of an ethylenebisstearylamide powder (B-13) (volume average particle size: 52 μm, melting point: 161° C.) were used instead of 0.3 parts of the polyethylene powder (B-1). The results are shown in Table 3.

Comparative Example 9

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 220° C.

Then, using 100 parts of the pellet-shaped article of the block copolymer (A-1) thus obtained, a block-copolymer pellet and an adhesive sheet were produced and evaluated in the same manner as in Example 1 except that 0.3 parts of talc (B-14) (BET specific surface area: 7.00 m$^2$/g, volume average particle size: 8 μm, bulk density: 0.25 g/cm$^3$, the content of particles having a particle size of 20 μm or more: 0.5 vol %) were used instead of 0.3 parts of the polyethylene powder (B-1). The results are shown in Table 3.

Comparative Example 10

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 235° C.

Then, using 100 parts of the pellet-shaped article of the block copolymer (A-1) thus obtained, a block-copolymer pellet and an adhesive sheet were produced and evaluated in the same manner as in Example 1 except that 0.3 parts of silica (B-15) (BET specific surface area: 180 m$^2$/g, volume average particle size: 10 μm, bulk density: 0.10 g/cm$^3$, the content of particles having a particle size of 20 μm or more: 0.5 vol %) were used instead of 0.3 parts of the polyethylene powder (B-1). The results are shown in Table 3.

Comparative Example 11

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 240° C.

Then, a block-copolymer pellet and an adhesive sheet were produced and evaluated in the same manner as in Example 2 except that 100 parts of the pellet-shaped article of the block copolymer (A-1) thus obtained was used. The results are shown in Table 3.

Comparative Example 12

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 150° C.

Then, a block-copolymer pellet and an adhesive sheet were produced and evaluated in the same manner as in Example 2 except that 100 parts of the pellet-shaped article of the block copolymer (A-1) thus obtained was used. The results are shown in Table 3.

Example 6

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 215° C.

Then, using 100 parts of the pellet-shaped article of the block copolymer (A-1) thus obtained, a block-copolymer pellet and an adhesive sheet were produced and evaluated in the same manner as in Example 1 except that a mixture of 0.24 parts of the polyethylene powder (B-1) and 0.06 parts of the polypropylene powder (B-5) was used instead of 0.3 parts of the polyethylene powder (B-1). The results are shown in Table 4. The content of particles having a particle size of 20 μm or more in the mixed powder of the polyethylene powder (B-1) and the polypropylene powder (B-5) used in Example 6 was 9.0 vol %.

Example 7

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 220° C.

Then, using 100 parts of the pellet-shaped article of the block copolymer (A-1) thus obtained, a block-copolymer pellet and an adhesive sheet were produced and evaluated in the same manner as in Example 1 except that a mixture of 0.27 parts of the polypropylene powder (B-2) and 0.03 parts of the polypropylene powder (B-5) was used instead of 0.3 parts of the polyethylene powder (B-1). The results are shown in Table 4. The content of particles having a particle size of 20 μm or more in the mixed powder of the polypropylene powder (B-2) and the polypropylene powder (B-5) used in Example 7 was 4.5 vol %.

Example 8

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 220° C.

Then, using 100 parts of the pellet-shaped article of the block copolymer (A-1) thus obtained, a block-copolymer pellet and an adhesive sheet were produced and evaluated in the same manner as in Example 1 except that a mixture of 0.15 parts of the polyethylene powder (B-1) and 0.15 parts of the polypropylene powder (B-5) was used instead of 0.3 parts of the polyethylene powder (B-1). The results are shown in Table 4. The content of particles having a particle size of 20 μm or more in the mixed powder of the polyethylene powder (B-1) and the polypropylene powder (B-5) used in Example 8 was 22.5 vol %.

Example 9

A pellet-shaped article of the block copolymer (A-1) was obtained by using the block copolymer (A-1) obtained in Production Example 1 and in the same manner as in Example 1 except that the molding temperature (resin temperature) of the twin screw extruder was set at 220° C.

Then, using 100 parts of the pellet-shaped article of the block copolymer (A-1) thus obtained, a block-copolymer pellet and an adhesive sheet were produced and evaluated in the same manner as in Example 1 except that a mixture of 0.15 parts of the polypropylene powder (B-2) and 0.15 parts of the polypropylene powder (B-5) was used instead of 0.3 parts of the polyethylene powder (B-1). The results are shown in Table 4. The content of particles having a particle size of 20 μm or more in the mixed powder of the polypropylene powder (B-2) and the polypropylene powder (B-5) used in Example 9 was 22.5 vol %.

Example 10

The block copolymer (A-2) obtained in Production Example 2 was charged into a twin screw extruder. The discharged strands were cooled in water at 10° C., and then cut into a length of 2.5 mm by a pelletizer to obtain a pellet-shaped article of the block copolymer (A-2) having a diameter of 2.5 mm and a length of 2.5 mm. At this time, the molding temperature (resin temperature) of the twin screw extruder was 205° C.

Then, a block-copolymer pellet and an adhesive sheet were produced and evaluated in the same manner as in Example 2 except that 100 parts of the pellet-shaped article of the block copolymer (A-2) thus obtained was used. The results are shown in Table 4.

Example 11

A pellet-shaped article of the block copolymer (A-2) was obtained by using the block copolymer (A-2) obtained in Production Example 2 and in the same manner as in Example 10 except that the molding temperature (resin temperature) of the twin screw extruder was set at 210° C.

Then, using 100 parts of the pellet-shaped article of the block copolymer (A-2) thus obtained, a block-copolymer pellet and an adhesive sheet were produced and evaluated in the same manner as in Example 10 except that a mixture of 0.27 parts of the polypropylene powder (B-2) and 0.03 parts of the polypropylene powder (B-5) was used instead of 0.3 parts of the polypropylene powder (B-2). The results are shown in Table 4. The content of particles having a particle size of 20 μm or more in the mixed powder of the polypropylene powder (B-2) and the polypropylene powder (B-5) used in Example 11 was 4.5 vol %.

Example 12

The block copolymer (A-3) obtained in Production Example 3 was charged into a twin screw extruder. The discharged strands were cooled in water at 10° C., and then cut into a length of 2.5 mm by a pelletizer to obtain a pellet-shaped article of the block copolymer (A-3) having a diameter of 2.5 mm and a length of 2.5 mm. At this time, the molding temperature (resin temperature) of the twin screw extruder was 230° C.

Then, a block-copolymer pellet and an adhesive sheet were produced and evaluated in the same manner as in Example 1 except that 100 parts of the pellet-shaped article of the block copolymer (A-3) thus obtained was used. The results are shown in Table 4.

Example 13

A block-copolymer pellet and an adhesive sheet were produced and evaluated in the same manner as in Example 12 except that a mixture of 0.24 parts of the polyethylene powder (B-1) and 0.06 parts of the polypropylene powder (B-5) was used instead of 0.3 parts of the polyethylene powder (B-1). The results are shown in Table 4. The content of particles having a particle size of 20 μm or more in the mixed powder of the polyethylene powder (B-1) and the polypropylene powder (B-5) used in Example 13 was 9.0 vol %.

Example 14

The block copolymer (A-4) obtained in Production Example 4 was charged into a twin screw extruder. The discharged strands were cooled in water at 10° C., and then cut into a length of 2.5 mm by a pelletizer to obtain a pellet-shaped article of the block copolymer (A-4) having a diameter of 2.5 mm and a length of 2.5 mm. At this time, the molding temperature (resin temperature) of the twin screw extruder was 215° C.

Then, a block-copolymer pellet and an adhesive sheet were produced and evaluated in the same manner as in Example 1 except those 100 parts of the pellet-shaped article of the block copolymer (A-4) thus obtained was used. The results are shown in Table 4.

Example 15

A block-copolymer pellet and an adhesive sheet were produced and evaluated in the same manner as in Example 14 except that a mixture of 0.18 parts of the polyethylene powder (B-1) and 0.02 parts of the polypropylene powder (B-5) was used instead of 0.2 parts of the polyethylene powder (B-1). The results are shown in Table 4. The content of particles having a particle size of 20 μm or more in the mixed powder of the polyethylene powder (B-1) and the polypropylene powder (B-5) used in Example 15 was 4.5 vol %.

Example 16

The block copolymer (A-5) obtained in Production Example 5 was charged into a twin screw extruder. The discharged strands were cooled in water at 10° C., and then cut into a length of 2.5 mm by a pelletizer to obtain a pellet-shaped article of the block copolymer (A-5) having a diameter of 2.5 mm and a length of 2.5 mm. At this time, the molding temperature (resin temperature) of the twin screw extruder was 225° C.

Then, a block-copolymer pellet and an adhesive sheet were produced and evaluated in the same manner as in Example 2 except those 100 parts of the pellet-shaped article of the block copolymer (A-5) thus obtained was used. The results are shown in Table 4.

Example 17

A block-copolymer pellet and an adhesive sheet were produced and evaluated in the same manner as in Example 16 except that a mixture of 0.16 parts of the polypropylene powder (B-2) and 0.04 parts of the polypropylene powder (B-5) was used instead of 0.2 parts of the polypropylene powder (B-2). The results are shown in Table 4. The content of particles having a particle size of 20 μm or more in the mixed powder of the polypropylene powder (B-2) and the polypropylene powder (B-5) used in Example 17 was 4.5 vol %.

Comparative Example 13

The block copolymer (A-2) obtained in Production Example 2 was charged into a twin screw extruder. The discharged strands were cooled in water at 10° C., and then cut into a length of 2.5 mm by a pelletizer to obtain a pellet-shaped article of the block copolymer (A-2) having a diameter of 2.5 mm and a length of 2.5 mm. At this time, the molding temperature (resin temperature) of the twin screw extruder was 210° C.

Then, a block-copolymer pellet and an adhesive sheet were produced and evaluated in the same manner as in Comparative Example 1 except that 100 parts of the pellet-shaped article of the block copolymer (A-2) thus obtained was used. The results are shown in Table 4.

Comparative Example 14

The block copolymer (A-3) obtained in Production Example 3 was charged into a twin screw extruder. The discharged strands were cooled in water at 10° C., and then cut into a length of 2.5 mm by a pelletizer to obtain a pellet-shaped article of the block copolymer (A-3) having a diameter of 2.5 mm and a length of 2.5 mm. At this time, the molding temperature (resin temperature) of the twin screw extruder was 230° C.

Then, using 100 parts of the pellet-shaped article of the block copolymer (A-3) thus obtained, a block-copolymer pellet and an adhesive sheet were produced and evaluated in the same manner as in Comparative Example 2 except that the amount of the polyethylene powder (B-7) used was changed from 0.3 parts to 0.2 parts. The results are shown in Table 4.

Comparative Example 15

The block copolymer (A-4) obtained in Production Example 4 was charged into a twin screw extruder. The discharged strands were cooled in water at 10° C., and then cut into a length of 2.5 mm by a pelletizer to obtain a pellet-shaped article of the block copolymer (A-4) having a diameter of 2.5 mm and a length of 2.5 mm. At this time, the molding temperature (resin temperature) of the twin screw extruder was 215° C.

Then, using 100 parts of the pellet-shaped article of the block copolymer (A-4) thus obtained, a block-copolymer pellet and an adhesive sheet were produced and evaluated in the same manner as in Comparative Example 4 except that the amount of the polyethylene powder (B-9) used was changed from 0.3 parts to 0.2 parts. The results are shown in Table 4.

Comparative Example 16

The block copolymer (A-5) obtained in Production Example 5 was charged into a twin screw extruder. The discharged strands were cooled in water at 10° C., and then cut into a length of 2.5 mm by a pelletizer to obtain a pellet-shaped article of the block copolymer (A-5) having a diameter of 2.5 mm and a length of 2.5 mm. At this time, the molding temperature (resin temperature) of the twin screw extruder was 235° C.

Then, using 100 parts of the pellet-shaped article of the block copolymer (A-5) thus obtained, a block-copolymer pellet and an adhesive sheet were produced and evaluated in the same manner as in Comparative Example 5 except that the amount of the polyethylene powder (B-10) used was changed from 0.3 parts to 0.2 parts. The results are shown in Table 4.

Example 18

A pellet-shaped article of the block copolymer (A-1) containing polystyrene was obtained by forming a pellet-shaped article of the block copolymer (A-1) obtained in Production Example 1 using the twin screw extruder while controlling the molding temperature (resin temperature) at 170° C., and further compounding 0.5 parts of polystyrene with respect to 100 parts of the block copolymer (A-1) for pelletization. A homopolymer of styrene was used as the polystyrene (the same applies to Examples 19 to 23).

Then, a block-copolymer pellet and an adhesive sheet were produced and evaluated in the same manner as in Example 2 except that 100 parts of the pellet-shaped article of the block copolymer (A-1) containing 0.5 parts of the polystyrene was used. The results are shown in Table 5.

Example 19

A pellet-shaped article of the block copolymer (A-1) containing the polystyrene was obtained by forming a pellet-shaped article of the block copolymer (A-1) obtained in Production Example 1 using the twin screw extruder while controlling the molding temperature (resin temperature) at 200° C., and further compounding 3.5 parts of the polystyrene with respect to 100 parts of the block copolymer (A-1) for pelletization.

Then, a block-copolymer pellet and an adhesive sheet were produced and evaluated in the same manner as in Example 2 except that 100 parts of the pellet-shaped article of the block copolymer (A-1) containing 3.5 parts of the polystyrene was used. The results are shown in Table 5.

Example 20

A pellet-shaped article of the block copolymer (A-4) containing polystyrene was obtained by forming a pellet-shaped article of the block copolymer (A-4) obtained in Production Example 4 using the twin screw extruder while controlling the molding temperature (resin temperature) at 210° C., and further compounding 0.8 parts of the polystyrene with respect to 100 parts of the block copolymer (A-4) for pelletization.

Then, using 100 parts of the pellet-shaped article of the block copolymer (A-4) containing 0.8 parts of the polystyrene, a block-copolymer pellet and an adhesive sheet were produced and evaluated in the same manner as in Example 2 except that the amount of the polypropylene powder (B-2) used was changed from 0.3 parts to 0.2 parts. The results are shown in Table 5.

Example 21

A pellet-shaped article of the block copolymer (A-4) containing the polystyrene was obtained by forming a pellet-shaped article of the block copolymer (A-4) obtained in Production Example 4 using the twin screw extruder while controlling the molding temperature (resin temperature) at 225° C., and further compounding 4.1 parts of the polystyrene was further compounded with respect to 100 parts of the block copolymer (A-4) for pelletization.

Then, using 100 parts of the pellet-shaped article of the block copolymer (A-4) containing 4.1 parts of the polystyrene, a block-copolymer pellet and an adhesive sheet were produced and evaluated in the same manner as in Example 2 except that the amount of the polypropylene powder (B-2) used was changed from 0.3 parts to 0.2 parts. The results are shown in Table 5.

Example 22

A pellet-shaped article of the block copolymer (A-1) containing the polystyrene was obtained by forming a pellet-shaped article of the block copolymer (A-1) obtained in Production Example 1 using the twin screw extruder while controlling the molding temperature (resin temperature) at 205° C., and further compounding 3.5 parts of the polystyrene with respect to 100 parts of the block copolymer (A-1) for pelletization.

Then, using 100 parts of the pellet-shaped article of the block copolymer (A-1) containing 3.5 parts of the polystyrene, a block-copolymer pellet and an adhesive sheet were produced and evaluated in the same manner as in Example 19 except that a mixture of 0.24 parts of the polyethylene powder (B-1) and 0.06 parts of the polypropylene powder (B-5) was used instead of 0.3 parts of the polypropylene powder (B-2). The results are shown in Table 5. The content of particles having a particle size of 20 μm or more in the mixed powder of the polyethylene powder (B-1) and the polypropylene powder (B-5) used in Example 22 was 9.0 vol %.

Example 23

A pellet-shaped article of the block copolymer (A-4) containing the polystyrene was obtained by forming a pellet-shaped article of the block copolymer (A-4) obtained in Production Example 4 using the twin screw extruder while the molding temperature (resin temperature) at 230° C., and further compounding t4.1 parts of the polystyrene with respect to 100 parts of the block copolymer (A-4) for pelletization.

Then, using 100 parts of the pellet-shaped article of the block copolymer (A-4) containing 4.1 parts of the polystyrene, a block-copolymer pellet and an adhesive sheet were produced and evaluated in the same manner as in Example 21 except that a mixture of 0.16 parts of the polypropylene powder (B-2) and 0.04 parts of the polypropylene powder (B-5) was used instead of 0.2 parts of the polypropylene powder (B-2). The results are shown in Table 5. The content of particles having a particle size of 20 μm or more in the mixed powder of the polypropylene powder (B-2) and the polypropylene powder (B-5) used in Example 23 was 9.0 vol %.

TABLE 3

|  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Pellet-shaped article of block copolymer (A-1) | [part] | 100 | 100 | 100 | 100 | 100 | 100 | 100 | 100 | 100 |
| Pellet-shaped article of block copolymer (A-2) | [part] |  |  |  |  |  |  |  |  |  |
| Pellet-shaped article of block copolymer (A-3) | [part] |  |  |  |  |  |  |  |  |  |
| Pellet-shaped article of block copolymer (A-4) | [part] |  |  |  |  |  |  |  |  |  |
| Pellet-shaped article of block copolymer (A-5) | [part] |  |  |  |  |  |  |  |  |  |
| Molding temperature of block-copolymer pellet (resin temperature) | [° C.] | 215 | 160 | 230 | 200 | 240 | 210 | 170 | 180 | 240 |
| Dusting agent (B) | [part] | 0.3 | 0.3 | 0.3 | 0.3 | 0.3 | 0.3 | 0.3 | 0.3 | 0.3 |
| Properties of dusting agent (B) |  |  |  |  |  |  |  |  |  |  |  |
| Type |  | (B-1) | (B-2) | (B-3) | (B-4) | (B-5) | (B-6) | (B-7) | (B-8) | (B-9) |
| Material |  | PE | PP | PE | PP | PP | PE | PE | PE | PE |
| BET specific surface area | [m$^2$/g] | 1.249 | 0.845 | 2.228 | 1.523 | 0.958 | 1.499 | 3.539 | 0.432 | 0.330 |
| Volume average particle size | [μm] | 2.5 | 5.5 | 8.5 | 9.5 | 18 | 2.7 | 3.5 | 110 | 480 |
| Bulk density | [g/cm$^3$] | 0.13 | 0.14 | 0.25 | 0.29 | 0.25 | 0.08 | 0.11 | 0.33 | 0.39 |
| Melting point | [° C.] | 93 | 155 | 124 | 145 | 116 | 140 | 93 | 153 | 138 |
| Content of particles having a particle size of 20 μm or more in dusting agent (B) | [vol %] | 0 | 0 | 1.0 | 2.5 | 45.0 | 0 | 0 | 100 | 100 |

TABLE 3-continued

|  |  |  |  |  |  |  |  |  |  |
|---|---|---|---|---|---|---|---|---|---|
| Shore A hardness of block-copolymer pellet |  | 33 | 33 | 33 | 33 | 33 | 33 | 33 | 33 | 33 |
| BET specific surface area of block-copolymer pellet | [m²/g] | 0.014 | 0.045 | 0.005 | 0.025 | 0.002 | 0.019 | 0.038 | 0.032 | 0.003 |
| Block resistance |  | C | C | C | C | C | F | C | F | F |
| Dusting |  | A | A | A | A | A | F | F | A | A |
| Transparency |  | A | A | A | A | A | A | A | A | A |
| Odor |  | A | A | A | A | A | A | A | A | A |
| Peeling adhesive strength |  | A | A | A | A | A | A | A | A | A |

|  |  | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|
| Pellet-shaped article of block copolymer (A-1) | [part] | 100 | 100 | 100 | 100 | 100 | 100 | 100 | 100 |
| Pellet-shaped article of block copolymer (A-2) | [part] |  |  |  |  |  |  |  |  |
| Pellet-shaped article of block copolymer (A-3) | [part] |  |  |  |  |  |  |  |  |
| Pellet-shaped article of block copolymer (A-4) | [part] |  |  |  |  |  |  |  |  |
| Pellet-shaped article of block copolymer (A-5) | [part] |  |  |  |  |  |  |  |  |
| Molding temperature of block-copolymer pellet (resin temperature) | [° C.] | 230 | 210 | 200 | 170 | 220 | 235 | 240 | 150 |
| Dusting agent (B) | [part] | 0.3 | 0.3 | 0.3 | 0.3 | 0.3 | 0.3 | 0.3 | 0.3 |
| Properties of dusting agent (B) |  |  |  |  |  |  |  |  |  |
| Type |  | (B-10) | (B-11) | (B-12) | (B-13) | (B-14) | (B-15) | (B-2) | (B-2) |
| Material |  | PE | Highly modified hydrocarbon | Calcium stearate | Ethylenebis-stearylamide | Talc | Silica | PP | PP |
| BET specific surface area | [m²/g] | 0.602 | 0.892 | 18.44 | — | 7.00 | 180 | 0.845 | 0.845 |
| Volume average particle size | [μm] | 8.5 | 8 | 9.7 | 52 | 8 | 10 | 5.5 | 5.5 |
| Bulk density | [g/cm³] | 0.35 | 0.24 | 0.19 | — | 0.25 | 0.10 | 0.14 | 0.14 |
| Melting point | [° C.] | 153 | 74 | 148 | 161 | — | — | 155 | 155 |
| Content of particles having a particle size of 20 μm or more in dusting agent (B) | [vol %] | 1.5 | 0.5 | 26.0 | — | 0.5 | 0.5 | 0 | 0 |
| Shore A hardness of block-copolymer pellet |  | 33 | 33 | 33 | 33 | 33 | 33 | 33 | 33 |
| BET specific surface area of block-copolymer pellet | [m²/g] | 0.007 | 0.018 | 0.024 | 0.040 | 0.013 | 0.003 | 0.0004 | 0.063 |
| Block resistance |  | F | F | C | C | C | C | F | F |
| Dusting |  | A | A | A | A | A | F | A | A |
| Transparency |  | A | A | A | A | F | F | A | A |
| Odor |  | A | A | A | F | A | A | A | A |
| Peeling adhesive strength |  | A | A | F | F | A | A | A | A |

TABLE 4

|  |  | Example 6 | Example 7 | Example 8 | Example 9 | Example 10 | Example 11 | Example 12 | Example 13 | Example 14 |
|---|---|---|---|---|---|---|---|---|---|---|
| Pellet-shaped article of block copolymer (A-1) | [part] | 100 | 100 | 100 | 100 |  |  |  |  |  |
| Pellet-shaped article of block copolymer (A-2) | [part] |  |  |  |  | 100 | 100 |  |  |  |
| Pellet-shaped article of block copolymer (A-3) | [part] |  |  |  |  |  |  | 100 | 100 |  |
| Pellet-shaped article of block copolymer (A-4) | [part] |  |  |  |  |  |  |  |  | 100 |
| Pellet-shaped article of block copolymer (A-5) | [part] |  |  |  |  |  |  |  |  |  |
| Molding temperature of block-copolymer pellet (resin temperature) | [° C.] | 215 | 220 | 220 | 220 | 205 | 210 | 230 | 230 | 215 |
| Dusting agent (B) | [part] | 0.24 (B-1) 0.03 (B-5) | 0.27 (B-2) 0.03 (B-5) | 0.15 (B-1) 0.15 (B-5) | 0.15 (B-2) 0.15 (B-5) | 0.3 (B-2) | 0.27 (B-2) 0.03 (B-5) | 0.3 (B-1) | 0.24 (B-1) 0.08 (B-5) | 0.2 (B-1) |
| Properties of dusting agent (B) |  |  |  |  |  |  |  |  |  |  |
| Type |  | (B-1) | (B-2) | (B-1) | (B-2) | (B-2) | (B-2) | (B-1) | (B-1) | (B-1) |
| Material |  | PE | PP | PE | PP | PP | PP | PE | PE | PE |
| BET specific surface area | [m²/g] | 1.249 | 0.845 | 1.249 | 0.845 | 0.845 | 0.845 | 1.249 | 1.249 | 1.249 |

TABLE 4-continued

| | | | | | | | | | | |
|---|---|---|---|---|---|---|---|---|---|---|
| Volume average particle size | [μm] | 2.5 | 5.5 | 2.5 | 5.5 | 5.5 | 5.5 | 2.5 | 2.5 | 2.5 |
| Bulk density | [g/cm³] | 0.13 | 0.14 | 0.13 | 0.14 | 0.14 | 0.14 | 0.13 | 0.13 | 0.13 |
| Melting point | [° C.] | 93 | 155 | 93 | 155 | 155 | 155 | 93 | 93 | 93 |
| Type | | (B-5) | (B-5) | (B-5) | (B-5) | | (B-5) | | (B-5) | |
| Material | | PP | PP | PP | PP | | PP | | PP | |
| BET specific surface area | [m²/g] | 0.958 | 0.958 | 0.958 | 0.958 | | 0.958 | | 0.958 | |
| Volume average particle size | [μm] | 18 | 18 | 18 | 18 | | 18 | | 18 | |
| Bulk density | [g/cm³] | 0.25 | 0.25 | 0.25 | 0.25 | | 0.25 | | 0.25 | |
| Melting point | [° C.] | 116 | 116 | 116 | 116 | | 116 | | 116 | |
| Content of particles having particle size of 20 μm or more in dusting agent (B) | [vol %] | 3.0 | 4.5 | 22.5 | 22.5 | 0 | 4.5 | 0 | 9.0 | 0 |
| Shore A hardness of block-copolymer pellet | | 33 | 33 | 33 | 33 | 25 | 25 | 38 | 38 | 40 |
| BET specific surface area of block-copolymer pellet | [m²/g] | 0.015 | 0.014 | 0.014 | 0.013 | 0.020 | 0.018 | 0.005 | 0.005 | 0.026 |
| Block resistance | | B | B | B | B | C | B | C | B | C |
| Dusting | | A | A | A | A | A | A | A | A | A |
| Transparency | | A | A | A | A | A | A | A | A | A |
| Odor | | A | A | A | A | A | A | A | A | A |
| Peeling adhesive strength | | A | A | A | A | A | A | A | A | A |

| | | Example 15 | Example 16 | Example 17 | Comparative Example 13 | Comparative Example 14 | Comparative Example 15 | Comparative Example 16 |
|---|---|---|---|---|---|---|---|---|
| Pellet-shaped article of block copolymer (A-1) | [part] | | | | | | | |
| Pellet-shaped article of block copolymer (A-2) | [part] | | | | 100 | | | |
| Pellet-shaped article of block copolymer (A-3) | [part] | | | | | 100 | | |
| Pellet-shaped article of block copolymer (A-4) | [part] | 100 | | | | | 100 | |
| Pellet-shaped article of block copolymer (A-5) | [part] | | 100 | 100 | | | | 100 |
| Molding temperature of block-copolymer pellet (resin temperature) | [° C.] | 215 | 225 | 225 | 210 | 230 | 215 | 225 |
| Dusting agent (B) | [part] | 0.19 (B-1) 0.02 (B-5) | 0.2 | 0.15 (B-2) 0.04 (B-5) | 0.3 | 0.2 | 0.2 | 0.2 |
| Properties of dusting agent (B) | | | | | | | | |
| Type | | (B-1) | (B-2) | (B-2) | (B-6) | (B-7) | (B-8) | (B-10) |
| Material | | PE | PP | PP | PE | PE | PE | PE |
| BET specific surface area | [m²/g] | 1.249 | 0.845 | 0.845 | 1.499 | 3.539 | 0.330 | 0.602 |
| Volume average particle size | [μm] | 2.5 | 5.5 | 5.5 | 2.7 | 3.5 | 450 | 8.5 |
| Bulk density | [g/cm³] | 0.13 | 0.14 | 0.14 | 0.05 | 0.11 | 0.39 | 0.35 |
| Melting point | [° C.] | 93 | 155 | 155 | 140 | 93 | 138 | 153 |
| Type | | (B-5) | | (B-5) | | | | |
| Material | | PP | | PP | | | | |
| BET specific surface area | [m²/g] | 0.958 | | 0.958 | | | | |
| Volume average particle size | [μm] | 18 | | 18 | | | | |
| Bulk density | [g/cm³] | 0.25 | | 0.25 | | | | |
| Melting point | [° C.] | 116 | | 116 | | | | |
| Content of particles having particle size of 20 μm or more in dusting agent (B) | [vol %] | 4.5 | 0 | 9.0 | 0 | 0 | 100 | 1.5 |
| Shore A hardness of block-copolymer pellet | | 40 | 52 | 52 | 25 | 38 | 40 | 62 |
| BET specific surface area of block-copolymer pellet | [m²/g] | 0.025 | 0.020 | 0.020 | 0.019 | 0.005 | 0.024 | 0.0210 |
| Block resistance | | B | C | B | F | C | F | F |
| Dusting | | A | A | A | F | F | A | A |
| Transparency | | A | A | A | A | A | A | A |
| Odor | | A | A | A | A | A | A | A |
| Peeling adhesive strength | | A | A | A | A | A | A | A |

TABLE 5

| | | Example 18 | Example 19 | Example 20 | Example 21 | Example 22 | Example 23 |
|---|---|---|---|---|---|---|---|
| Pellet-shaped article of block copolymer (A-1) | [part] | 100 | 100 | | | 100 | |
| Pellet-shaped article of block copolymer (A-2) | [part] | | | | | | |
| Pellet-shaped article of block copolymer (A-3) | [part] | | | | | | |
| Pellet-shaped article of block copolymer (A-4) | [part] | | | 100 | 100 | | 100 |
| Pellet-shaped article of block copolymer (A-5) | [part] | | | | | | |
| Molding temperature of block-copolymer pellet (resin temperature) | [° C.] | 170 | 200 | 210 | 225 | 205 | 230 |
| Dusting agent (B) | [part] | 0.3 | 0.3 | 0.2 | 0.2 | 0.24 (B-1) 0.06 (B-5) | 0.16 (B-2) 0.04 (B-5) |
| Dusting agent (B) | [part] | 0.3 | 0.3 | 0.2 | 0.2 | 0.24 | 0.3 |
| Amount of polystyrene with respect to 100 parts of block copolymer | [part] | 0.5 | 3.5 | 0.8 | 4.1 | 3.5 | 4.1 |
| Properties of dusting agent (B) | | | | | | | |
| Type | | (B-2) | (B-2) | (B-2) | (B-2) | (B-1) | (B-2) |
| Material | | PP | PP | PP | PP | PE | PP |
| BET specific surface area | [m$^2$/g] | 0.845 | 0.845 | 0.845 | 0.845 | 1.249 | 0.845 |
| Volume average particle size | [μm] | 5.5 | 5.5 | 5.5 | 5.5 | 2.5 | 5.5 |
| Bulk density | [g/cm$^3$] | 0.14 | 0.14 | 0.14 | 0.14 | 0.13 | 0.14 |
| Melting point | [° C.] | 155 | 155 | 155 | 155 | 93 | 155 |
| Type | | | | | | (B-5) | (B-5) |
| Material | | | | | | PP | PP |
| BET specific surface area | [m$^2$/g] | | | | | 0.958 | 0.958 |
| Volume average particle size | [μm] | | | | | 18 | 18 |
| Bulk density | [g/cm$^3$] | | | | | 0.25 | 0.25 |
| Melting point | [° C.] | | | | | 116 | 116 |
| Content of particles having a particle size of 20 μm or more in dusting agent (B) | [vol %] | 0 | 0 | 0 | 0 | 9.0 | 9.0 |
| Shore A hardness of block-copolymer pellet | | 33 | 33 | 40 | 40 | 33 | 40 |
| BET specific surface area of block-copolymer pellet | [m$^2$/g] | 0.040 | 0.022 | 0.028 | 0.020 | 0.020 | 0.019 |
| Block resistance | | B | B | B | B | A | A |
| Dusting | | A | A | A | A | A | A |
| Transparency | | A | A | A | A | A | A |
| Odor | | A | A | A | A | A | A |
| Peeling adhesive strength | | A | A | A | A | A | A |

As shown in Tables 3 to 5, the block-copolymer pellets which contained 0.01 to 5 parts of the hydrocarbon-based dusting agent(s) (B) having a BET specific surface area of 0.50 to 3.00 m$^2$/g, a volume average particle size of 2.0 to 20 μm, a bulk density of 0.10 to 0.34 g/cm$^3$, and a melting point of 75° C. or higher with respect to 100 parts of the pellet-shaped article of the block copolymer (A), and had a Shore A hardness of 10 to 80 and a BET specific surface area of 0.001 to 0.05 m$^2$/g exhibited suppressed dusting, and had excellent block resistance, excellent transparency, and high adhesiveness to an adherend (Examples 1 to 23).

In particular, in the case where the hydrocarbon-based dusting agent (B) containing 3 to 40 vol % of particles having a particle size of 20 μm or more was used, the block resistance was particularly excellent (Examples 6 to 9, 11, 13, 15, 17, 22, and 23).

Also in the case where the pellet-shaped article further containing 0.5 to 5.0 parts of a polystyrene polymer with respect to 100 parts of the block copolymer (A) was used, the block resistance was particularly excellent (Examples 18 to 23).

On the other hand, in the case where the dusting agent that is not prepared from a hydrocarbon-based compound was used, or in the case where any one of the BET specific surface area, volume average particle size, bulk density, and melting point of the dusting agent used was outside the predetermined ranges defined in the present invention, the resulting block-copolymer pellet had dusting, inferior block resistance, inferior transparency, or low adhesiveness to an adherend (Comparative Examples 1 to 10, 13 to 16).

Further, in either case where the BET specific surface area of the block-copolymer pellet itself was less than 0.001 m$^2$/g, or where it was greater than 0.05 m$^2$/g, the block resistance was inferior (Comparative Examples 11 and 12).

The invention claimed is:

1. A block-copolymer pellet comprising 100 parts by weight of a pellet-shaped article of a block copolymer (A) and 0.01 to 5 parts by weight of a hydrocarbon-based dusting agent (B),
   wherein the block copolymer (A) has at least one aromatic vinyl polymer block and at least one conjugated diene polymer block,
   the hydrocarbon-based dusting agent (B) has a BET specific surface area of 0.50 to 3.00 m$^2$/g, a volume average particle size of 2.0 to 20 μm, a bulk density of 0.10 to 0.34 g/cm$^3$, and a melting point of 75° C. or higher, and
   the block-copolymer pellet has a Shore A hardness of 10 to 80, and a BET specific surface area of 0.001 to 0.05 m$^2$/g measured by a Kr adsorption method.

2. The block-copolymer pellet according to claim 1, wherein the hydrocarbon-based dusting agent (B) contains 3 to 40 vol % of particles having a particle size of 20 μm or more.

3. The block-copolymer pellet according to claim 1, wherein the pellet-shaped article further contains 0.5 to 5.0 parts by weight of a polystyrene polymer with respect to 100 parts by weight of the block copolymer (A).

4. The block-copolymer pellet according to claim 1, wherein the hydrocarbon-based dusting agent (B) is a dusting agent prepared from a polyolefin-based polymer.

5. The block-copolymer pellet according to claim 1, wherein the content of aromatic vinyl monomer units in the block copolymer (A) is 10 to 50 wt %.

6. The block-copolymer pellet according to claim 1, wherein the aromatic vinyl polymer block is a polymer block having styrene units as main repeating units, and the conjugated diene polymer block is a polymer block having isoprene units as main repeating units.

7. An adhesive composition obtained by using the block-copolymer pellet according to claim 1.

8. A stretch film obtained by using the block-copolymer pellet according to claim 1.

* * * * *